United States Patent
Park et al.

(10) Patent No.: US 10,320,732 B2
(45) Date of Patent: Jun. 11, 2019

(54) MOBILE TERMINAL AND METHOD FOR CONTROLLING THE SAME

(71) Applicant: LG ELECTRONICS INC., Seoul (KR)

(72) Inventors: Sangjoo Park, Seoul (KR); Taeyong Kim, Seoul (KR); Daeho Moon, Seoul (KR); Sanghyun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 854 days.

(21) Appl. No.: 14/830,594

(22) Filed: Aug. 19, 2015

(65) Prior Publication Data

US 2016/0182427 A1 Jun. 23, 2016

(30) Foreign Application Priority Data

Dec. 23, 2014 (KR) .......................... 10-2014-0187421

(51) Int. Cl.
*G06F 15/16* (2006.01)
*H04L 12/58* (2006.01)
*H04W 88/02* (2009.01)
*H04M 1/725* (2006.01)

(52) U.S. Cl.
CPC ........ *H04L 51/22* (2013.01); *H04M 1/72552* (2013.01); *H04W 88/02* (2013.01)

(58) Field of Classification Search
CPC .... H04L 51/22; H04M 1/72552; H04W 88/02
See application file for complete search history.

(56) References Cited

U.S. PATENT DOCUMENTS

| 2012/0306774 A1* | 12/2012 | Lee ...................... G06F 3/0486 |
| | | 345/173 |
| 2013/0290435 A1* | 10/2013 | Martin .................... H04L 51/28 |
| | | 709/206 |

FOREIGN PATENT DOCUMENTS

| EP | 2434705 | 3/2012 |
| EP | 2584770 | 4/2013 |
| WO | 2009/109657 | 11/2009 |

OTHER PUBLICATIONS

European Patent Office Application Serial No. 15190367.1 Search Report dated Jul. 18, 2016, 7 pages.

* cited by examiner

*Primary Examiner* — Normin Abedin
(74) *Attorney, Agent, or Firm* — Lee, Hong, Degerman, Kang & Waimey

(57) ABSTRACT

A mobile terminal includes a wireless communication unit configured to receive and transmit a message through wireless communication from/to an external device, a display unit configured to display the message, and a controller configured to, when a preset type of touch is applied to a region where content of a link message is displayed on the display unit in a case where the message includes the content of the link message linked to the message, execute a message transmission function using at least part of the content of the link message.

20 Claims, 19 Drawing Sheets

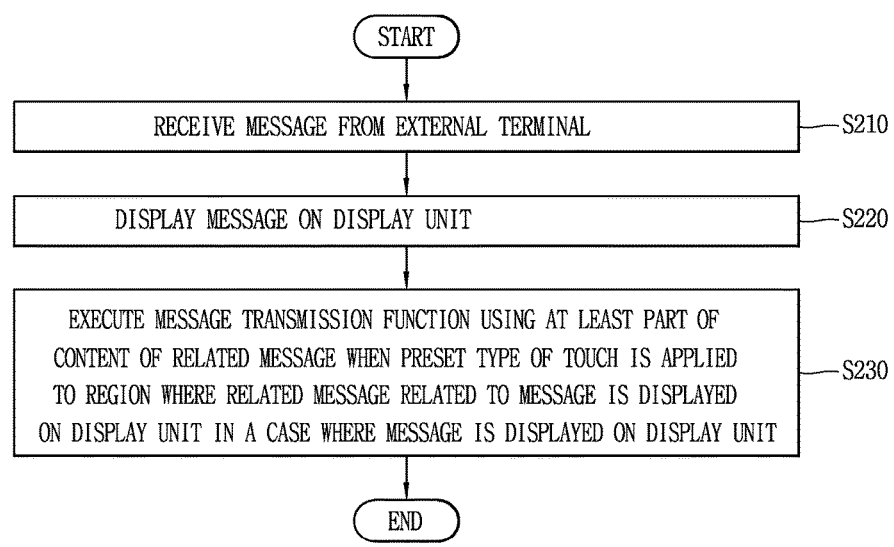

MOBILE TERMINAL AND METHOD FOR CONTROLLING THE SAME

CROSS-REFERENCE TO RELATED APPLICATIONS

Pursuant to 35 U.S.C. § 119(a), this application claims the benefit of earlier filing date and right of priority to Korean Patent Application No. 10-2014-0187421, filed on Dec. 23, 2014, the contents of which is incorporated by reference herein in its entirety.

BACKGROUND OF THE INVENTION

1. Field of the Invention

The present invention relates to a mobile terminal having an e-mail function, and a method for controlling the same.

2. Description of the Conventional Art

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions may include data and voice communications, capturing images and video through a camera, recording audio, playing music files through a speaker system, and displaying images and video on a display unit. Some mobile terminals additionally provide functions such as playing an electronic game, or executing a function of multimedia players. Especially, recent mobile terminals may receive multicast signal for providing visual content such as broadcasts, videos, or television programs.

As it becomes multifunctional, a mobile terminal can be allowed to capture still images or moving images, play music or video files, play games, receive broadcast and the like, so as to be implemented as an integrated multimedia player.

Efforts are ongoing to support and increase the functionality of mobile terminals. Such efforts include software and hardware improvements, as well as changes and improvements in the structural components.

Owing to developments of communications technology, it became possible for a mobile terminal to provide an e-mail function. However, due to the features of the mobile terminal having a relatively small-sized screen, it is required to develop a new UI different from the existing UI which provides an e-mail function on a computer monitor.

In the conventional e-mail system, in a case where a plurality of e-mails are associated with each other, a reply or transmission function has been executed with respect to all of the plural e-mails. Thus, there has been user's inconvenience in deleting the plural e-mails one by one when the user wishes to reply to part of the plural e-mails.

According to the present invention, it is possible to provide a control method capable of executing a reply or transmission function with respect to part of plural e-mails even in a case where the plural e-mails are associated with each other.

SUMMARY OF THE INVENTION

It is an object of the present invention to provide a mobile terminal, which is capable of enhancing a user's convenience by providing an e-mail function.

It is another object of the present invention to provide various control methods, capable of controlling at least one e-mail related to an e-mail.

To achieve these and other advantages and objects of the present invention, there is provided a mobile terminal including: a wireless communication unit configured to transceive a message through wireless communication with an external device; a display unit configured to display the message; and a controller configured to, when a preset type of touch is applied to a region where content of a link message is displayed on the display unit in a case where the message includes the content of the link message linked to the message, execute a message transmission function using at least part of the content of the link message.

In one embodiment, the controller may be further configured to display an execution screen of the message transmission function on the display unit when the message transmission function is executed, and the execution screen of the message transmission function may include the content of the link message.

In one embodiment, the controller may be further configured to control contents of remaining messages excluding the content of the link message to disappear from the execution screen of the message transmission function.

In one embodiment, the controller may be further configured to display a recipient list including items indicating identification information of at least one external device on the display unit, such that at least part of the content of the link message is transmitted to the at least one external device.

In one embodiment, the identification information of the at least one external device may be identification information of an external device related to the message.

In one embodiment, the controller may be further configured to display items indicating the at least one identification information, in a visually distinguishable manner, based on a preset condition.

In one embodiment, the link message may be plural, and the controller may be further configured to output a graphic object for selecting an object message of the message transmission function among the plural link messages, to the display unit.

In one embodiment, when a touch applied to the graphic object is sensed, the controller may be further configured to set, as an object message, a link message which is displayed on a region nearest to a region where the graphic object is displayed at a time point when the touch applied to the graphic object is sensed among the plural link messages.

In one embodiment, the graphic object indicating the message transmission function may be output to the display unit, and the controller may be further configured to output an execution screen of the message transmission function to the display unit when a touch applied to the graphic object indicating the message transmission function is sensed, display the message on at least part of the execution screen of the message transmission function, and output a selection icon around a region where each link message is displayed such that the link message is selected.

In one embodiment, the message transmission function may include a message reply function and a message forward function, and the controller may be further configured to output a list including items indicating the message reply function and the message forward function when a preset type of touch is applied to a region where the link message is displayed.

In one embodiment, the message and at least one identification information related to the link message may be together displayed on a region where the message is displayed, and when one identification information among the at least one identification information is selected, the controller may be further configured to control additional information related to the one identification information to be output around a region where the selected identification information is displayed.

In one embodiment, when one of the identification information is selected, the controller may be further configured to output a function list including at least one additional function item indicating executable functions using the identification information.

In one embodiment, the executable function using the identification information may be at least one of an e-mail transmission function, a short message service (SMS) function, a contact information function, a text function and a scheduling function.

In one embodiment, when one of the at least one additional function included in the function list is selected, the controller may be further configured to execute a function indicated by the one of the items using the one identification information.

In one embodiment, the display unit may be in one state of a first state to output screen information in a first direction and a second state to output screen information in a second direction, and the controller may be further configured to output the message to the display unit when the display unit is in the first state, and output both a first region where the message is displayed and a second region where an execution screen of the message transmission function is displayed to the display unit when the display unit is in the second state.

In one embodiment, the controller may be further configured to control the display unit to output the content of the link message to the second region, in response to a preset type of touch applied to a region where the content of the link message is displayed on the first region when the display unit is in the second state.

In one embodiment, when a flicking input with a preset direction is applied to a region where the content of the link message is displayed among an entire region where the message is displayed, the controller may be further configured to control the content of the link message to disappear from the display unit.

There is also provided with a method for controlling a mobile terminal which is executing an e-mail function, including: receiving a message from an external device; displaying the message on a display unit; and executing a message transmission function using at least part of content of a link message when a preset type of touch is applied to a region where the link message is displayed on the display unit, in a case where the message includes the content of the link message linked to the message.

In one embodiment, the method may further include displaying an execution screen of the message transmission function on the display unit when the message transmission function is executed, wherein the execution screen of the message transmission function may include the content of the link message.

In one embodiment, the content of a remaining message excluding the content of the link message may disappear from the execution screen of the message transmission function.

BRIEF DESCRIPTION OF THE DRAWING

The present invention will become more fully understood from the detailed description given hereinbelow and accompanying drawings, which are given by illustration only, and thus are not limitative of the present invention, and wherein:

FIG. 2 is a flowchart illustrating a control method to execute a function related to a message according to the present invention;

DETAILED DESCRIPTION OF THE PREFERRED EMBODIMENTS

Figure 1A:
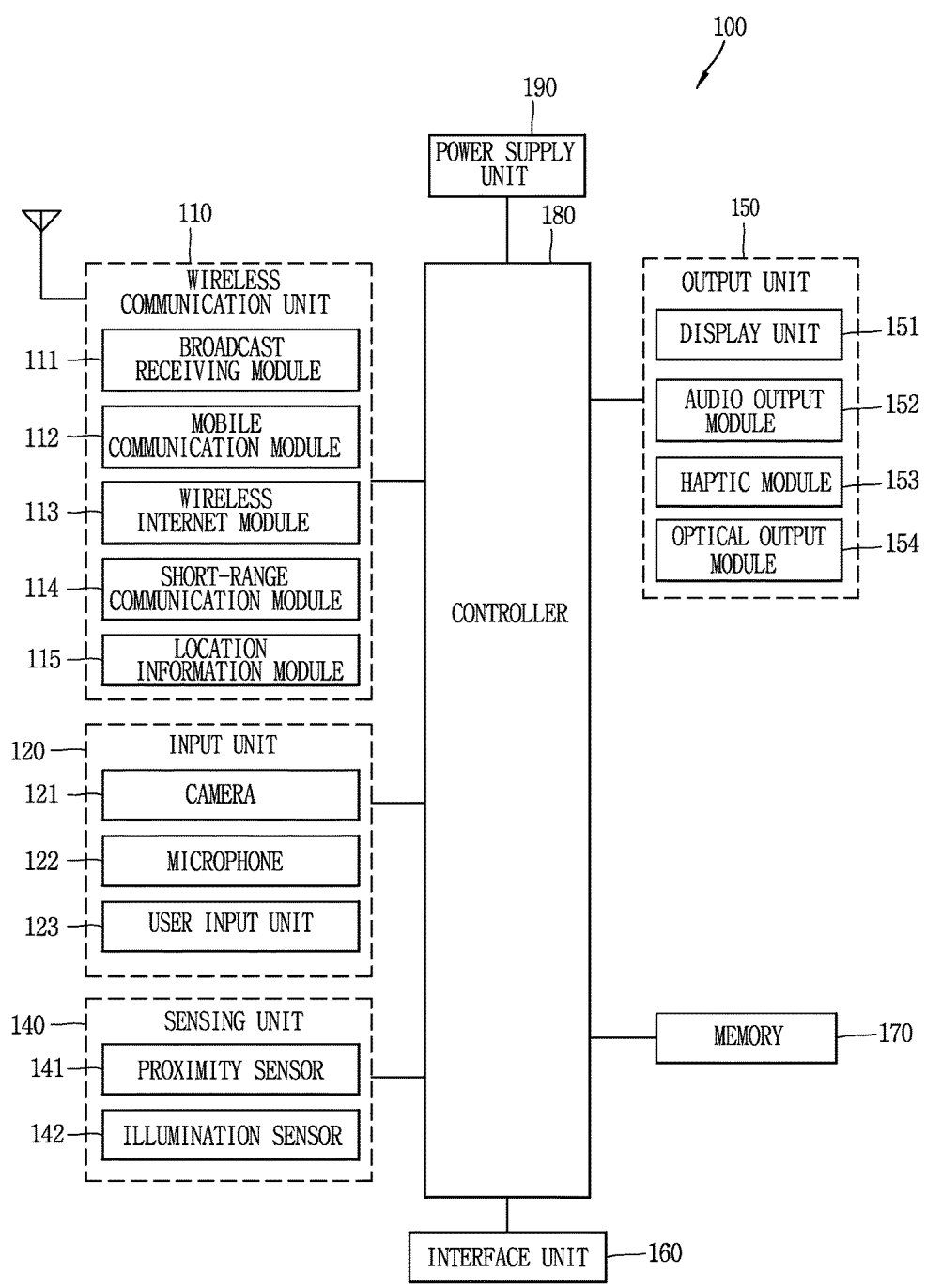
FIG. 1A is a block diagram illustrating a mobile terminal according to the present invention.

Description will now be given in detail of the exemplary embodiments, with reference to the accompanying drawings. For the sake of brief description with reference to the drawings, the same or equivalent components will be provided with the same reference numbers, and description thereof will not be repeated. A suffix "module" or "unit" used for constituent elements disclosed in the following description is merely intended for easy description of the specification, and the suffix itself does not give any special meaning or function. In describing the present invention, if a detailed explanation for a related known function or construction is considered to unnecessarily divert the gist of the present disclosure, such explanation has been omitted but would be understood by those skilled in the art. The accompanying drawings are used to help easily understood the technical idea of the present invention and it should be understood that the idea of the present disclosure is not limited by the accompanying drawings. In the following description, explanations will be made in order in the clockwise direction based on the drawing in a right upper side.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
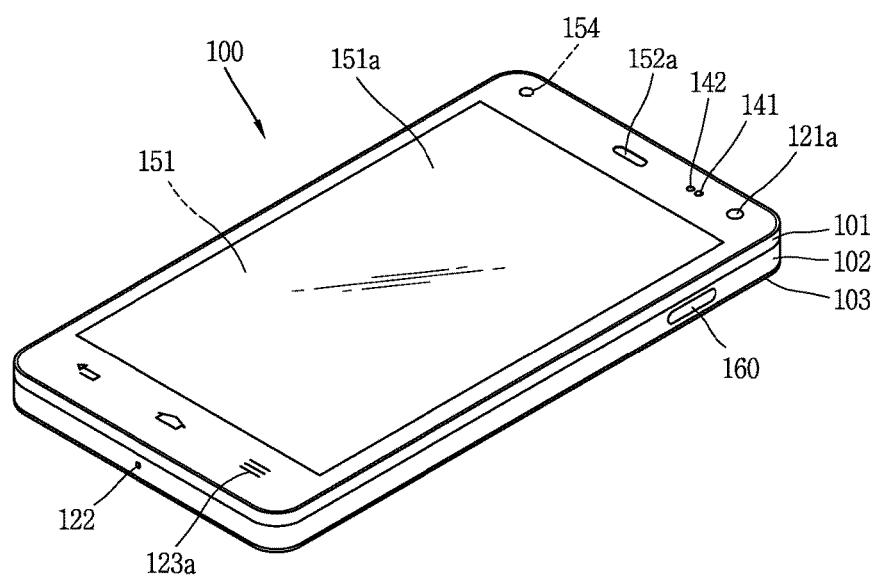
FIGS. 1B and 1C are schematic views illustrating an example of a mobile terminal, viewed from different directions according to the present invention.
Figure 1C:
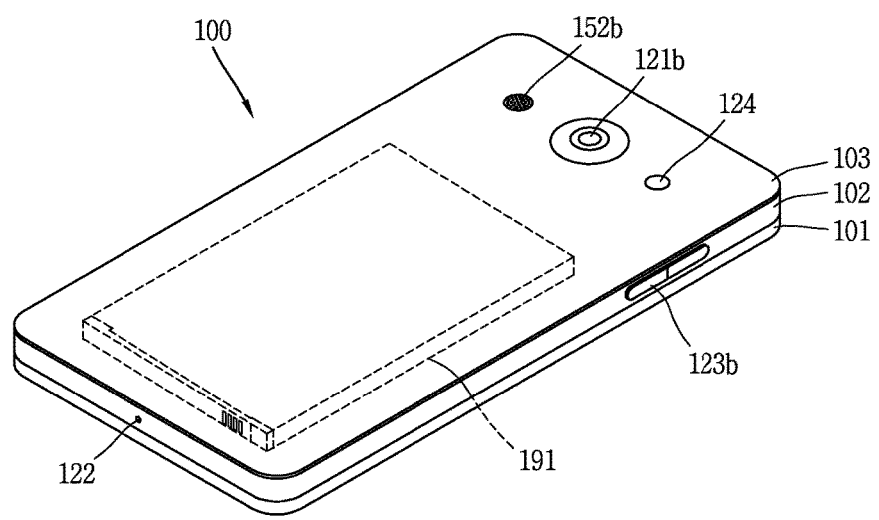

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method of a glass type terminal according to various embodiments to be explained later. The operation or the control method of the glass type terminal may be implemented on the glass type terminal by driving at least one application program stored in the memory 170.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

A communication system which is operable with the variously described mobile terminals will now be described in more detail. Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system. A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC).

The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1A is typically configured inside the mobile terminal 100 to receive broadcast signals transmitted by the BT.

Global Positioning System (GPS) satellites for locating the position of the mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

Hereinafter, embodiments in connection with a control method embodied in a mobile terminal according to the present invention will be described with reference to the accompanying drawings. In the following description of the drawings, it will be also apparent to those skilled in the art that various modifications and variations can be made in the present invention without departing from the spirit or scope of the invention. Hereinafter, explanations will be made clockwise based on the left upper drawing.

The mobile terminal can transmit and receive a message through communication. Here, the transmitted and received message may be called variously. For instance, the transmitted and received message may be named a text message, an instant message (IM), an e-mail, and an e-document, and the like.

In the following drawings, description will be made in a case where the message is an e-mail, but the present invention is not limited to this and may be applicable to all types of information that can be transmitted and received through communication.

Figure 3:
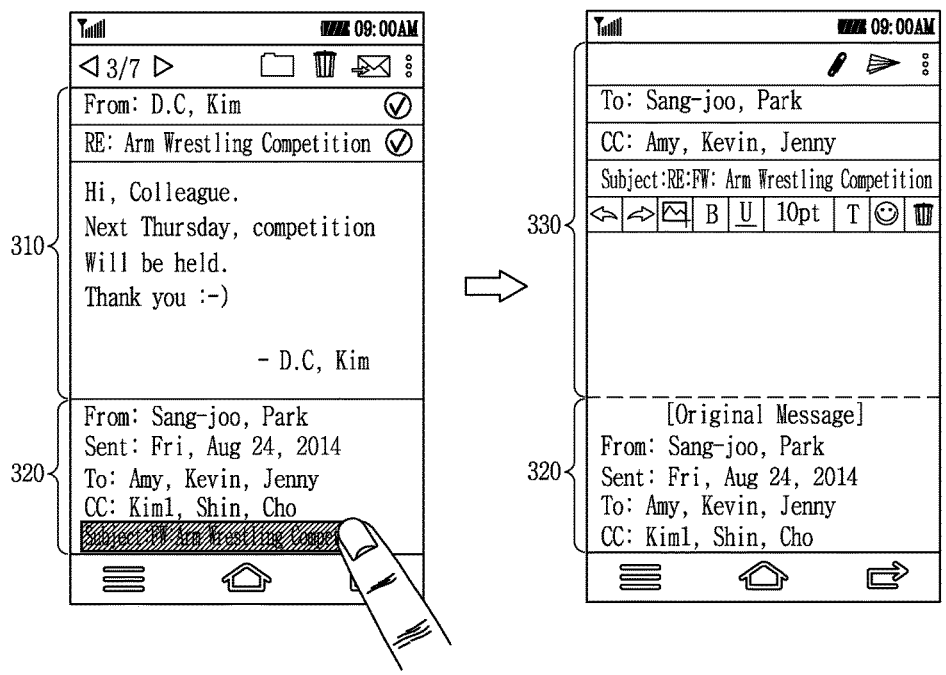
FIG. 3 is a schematic view illustrating the control method of FIG. 2 according to the present invention.

FIG. 2 is a flowchart illustrating a control method to execute a function related to a message in a mobile terminal according to the present invention, and FIG. 3 is a schematic view illustrating the control method of FIG. 2.

The mobile terminal according to the present invention can execute a step to receive a message from an external terminal (S210).

The mobile terminal according to the present invention can transmit and receive a message to/from an external terminal (an external device) through wireless communication. In this instance, the message may be a message including a link message linked to the message.

The link message is a message which is linked to the message, and may be either a message transmitted or received before receipt of the message from the same external terminal, or a message including content related to content of the message.

Meanwhile, in a case where the message is an e-mail, a user may be allocated e-mail address from a site that provides an e-mail service in order to use the e-mail service, and then can transmit and receive a message to/from the allocated e-mail address.

Further, the mobile terminal can execute a function related to an e-mail. In this instance, the function related to an e-mail may include an e-mail drafting function for drafting an e-mail to be transmitted to an external terminal, a reply function for replying an e-mail received from an external terminal, and a forwarding function for forwarding an e-mail received from an external terminal. Here, such functions may be called in various forms according to those skilled in the art.

For instance, in a case that the message is an e-mail, the link message may be a message that had been transmitted to an external device that received the e-mail before receipt of the e-mail. More specifically, when the message is a reply message to an original message, the link message may be the original message.

For another instance, in a case where the message is an e-mail, the link message may be original e-mails which have executed a reply or forwarding function, e-mails including the same identification information as the received e-mail, and e-mails including content related to content of the received e-mail.

More specifically, the e-mail related to the received e-mail may be an e-mail which has executed a reply function, an e-mail that a forwarding function has been executed by the received e-mail, and another e-mail received from another mobile terminal that transmitted the received e-mail.

When the message is received, the mobile terminal according to an embodiment of the present invention can execute a step to display the message on the display unit (S220).

When a message is received from an external terminal, the controller 180 may display the message on the display unit 151. In this instance, content of the message may include content of the link message linked to the message.

For instance, when the message is an e-mail and the link message is an original e-mail, a title of the e-mail, identification information of the other party that has transmitted the received e-mail, and content of the e-mail may be displayed on the display unit 151. Further, content of the original e-mail linked to the e-mail, a title of the original e-mail, and identification information related to the original e-mail may be displayed on the display unit 151.

In this instance, the controller 180 may display content of the message and content of the link message on the display unit 151, in a visually distinguishable manner.

For instance, the controller 180 may display the e-mail so as to be visually-distinguishable from the linked e-mail linked to the e-mail. More specifically, the controller 180 may mark a distinguishing line between the e-mail and the linked mail linked to the e-mail.

Further, not only content of the message, but also a graphic object indicating a message transmission function may be displayed on the display unit 151. For instance, on the display unit 151, may be displayed graphic objects indicating functions to execute various controls related to the message, such as a graphic object indicating a reply function to the message and a graphic object indicating a forwarding function to forward the message.

In a state that the message is displayed on the display unit 151, when a preset type of touch is applied to a region where a link message linked to the message is displayed on the display unit 151, the mobile terminal according to an embodiment of the present invention may execute a message transmission function using at least part of content of the link message (S230).

The controller 180 may sense that a preset type of touch is applied to a region where content of the link message is displayed on the display unit 151, in a state that the message has been displayed on the display unit 151.

The preset type of touch may be a flicking touch with a preset direction, a long touch, a multi-touch, a double touch that at least two short touches are applied within a preset time, etc.

The controller 180 may execute a message transmission function using at least part among the content of the link message when the preset type of touch is applied to a region where the content of the link message is displayed. The message transmission function may be a message reply function or a message forwarding function.

More specifically, the controller 180 may set an object message of the message transmission function, as the link message. In this instance, the controller 180 may not execute the message transmission function with respect to the content of the message, but execute with respect to the content of the link message which has been set as the target message.

When the message transmission function is executed, the controller 180 may display an execution screen of the message transmission function on the display unit 151. In this instance, the controller 180 may display the content of the link message on the execution screen of the message transmission function. Further, the controller 180 may not display content of remaining messages rather than the content of the link message on the execution screen of the message transmission function.

That is, when the message transmission function is executed using at least part of the link message, the controller 180 may control other content, except for the content of the link message, among content of the message being currently displayed on the display unit 151, to disappear.

As a result, the controller 180 may execute separately a message transmission function with respect to the link message in a state that a message including the content of the link message is displayed on the display unit 151.

For instance, in a case where the message is an e-mail, the controller 180 may control content of the e-mail to include content of a link e-mail linked to the e-mail.

More specifically, referring to the first drawing of FIG. 3, contents (310, 320) of the e-mail displayed on the display unit 151 may include content of the link e-mail linked to the e-mail. In this instance, in the contents (310, 320) of the e-mail, information such as a sender's or receiver's address of the e-mail, a title of the e-mail, content of the e-mail and a transmission date of the e-mail may be displayed.

In this instance, the controller 180 may select a link message linked to the message through various user interfaces in a state that the content of the message is displayed on the display unit 151.

The user interface for selecting the link message may include an interface to output a graphic object for selecting the link message around a region where each link message is displayed, an interface to select the link message according to a preset type of touch applied to a region where the link message is displayed, and the like. Here, the user interface for selecting the link message may be easily changed by those skilled in the art.

For instance, in a case where the message is an e-mail, as shown in the first drawing of FIG. 3, the controller 180 may sense that a preset type of touch is applied to a region where a title of the link e-mail linked to the e-mail is displayed. In this instance, the controller 180 may select a link e-mail (320) displayed on a region where the preset type of touch is applied.

When the link e-mail is selected, the controller 180 may execute a message transmission function with respect to the link e-mail. For instance, as shown in the second drawing of FIG. 3, the controller 180 may execute a reply function to transmit a reply to the link e-mail.

When the reply function is executed, screen information (330) related to the reply function may be displayed on the display unit 151. The screen information (330) related to the reply function may include a region for inputting a recipient's address of an e-mail, a region for inputting a title of an e-mail, and a region for inputting content of an e-mail. Further, the screen information (330) related to the reply function may include content of the link e-mail (320).

In this instance, the controller 180 may automatically display a sender's address with respect to the selected e-mail (320) on the region for inputting a recipient's address of an e-mail address. Further, a title indicating a reply to the selected e-mail (320) may be automatically indicated on the region for inputting a title of an e-mail.

In this instance, the controller 180 may not execute a reply function with respect to the e-mail except the link e-mail. That is, the controller 180 may not display content of the e-mail on screen information related to a reply function, even though the reply function is executed with respect to the link e-mail.

Thus, a user can execute a message transmission function with respect to a link message linked to a message without a plurality of control commands, in a state that the message is output.

According to the present invention, in a case where content of a message received from an external terminal includes content of a link message linked to the message, it is possible to selectively execute a message transmission function with respect to the link message linked to the message in a state that the content of the message is displayed on the display unit 151.

Hereinafter, with reference to the accompanying drawings, will be described in detail, a method for selecting the other party who is to receive a message in executing a message transmission function in a case where content of a link message linked to the message is included in content of the message.

Figure 4A:
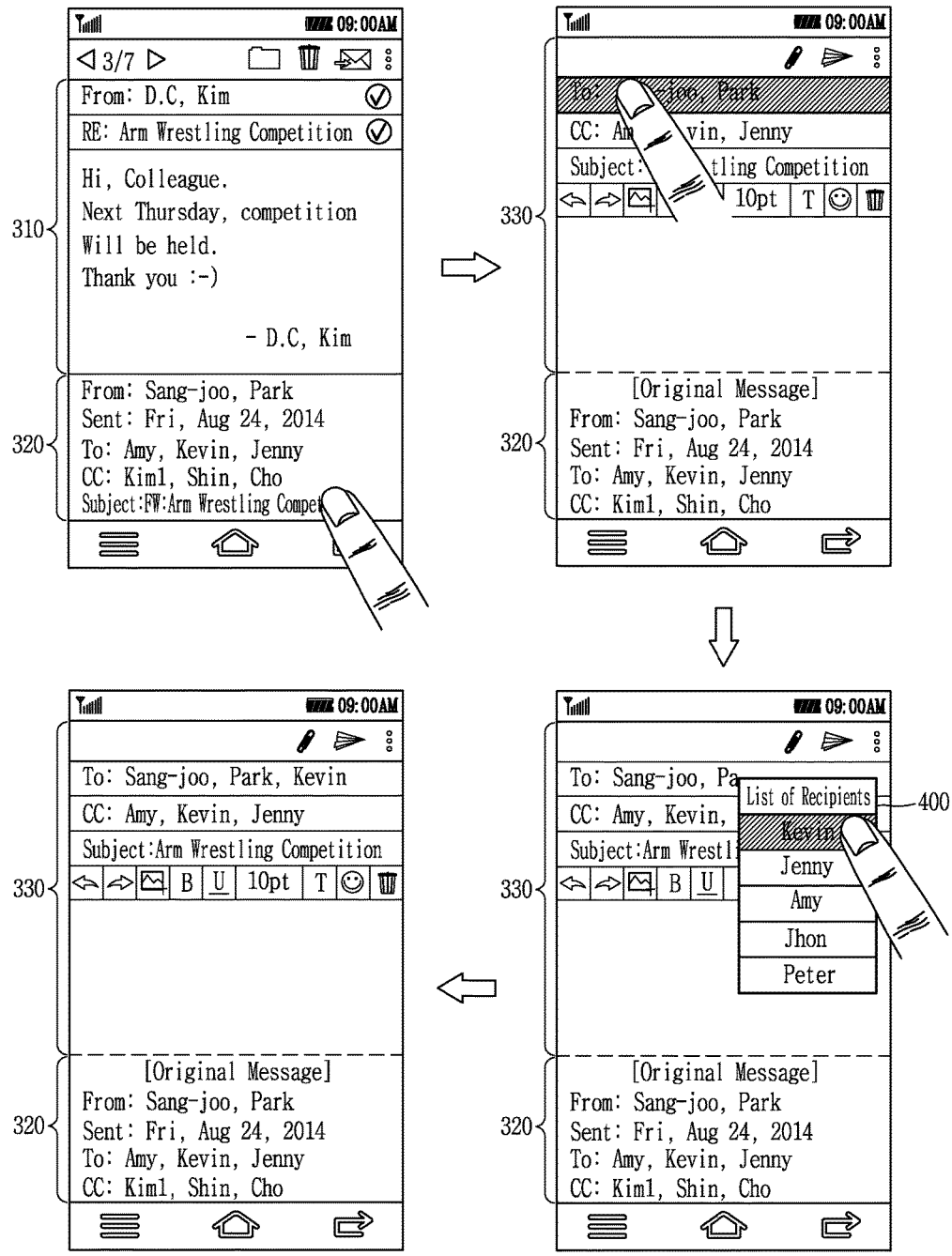
FIGS. 4A through 4C are schematic views illustrating a method to select the other party who will receive an e-mail when executing a reply or transmission function with respect to a related message, in a case where content of the e-mail has a related e-mail according to the present invention.
Figure 4B:
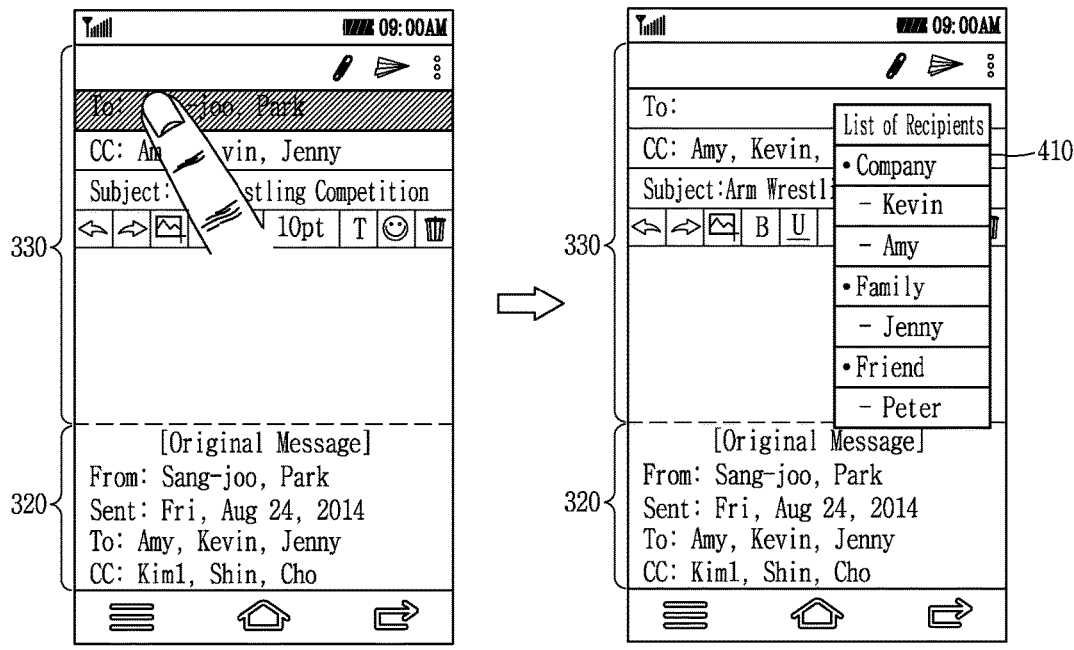
Figure 4C:
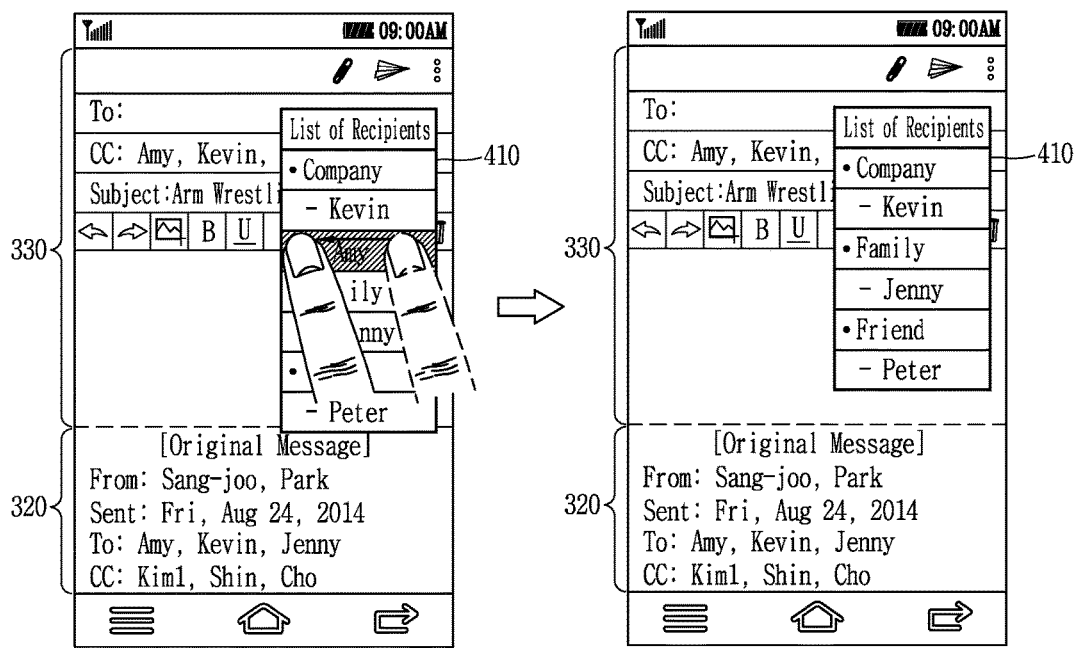

FIGS. 4A through 4C are schematic views illustrating a method to select the other party who will receive an e-mail when executing a reply or transmission function with respect to a link message, in a case where the link message linked to the e-mail exists in content of the e-mail according to the present invention.

The controller 180 may execute a message transmission function using at least part of the link message in a case where content of the link message linked to the message is included in content of the message.

In this instance, the controller 180 may detect identification information related to the message from the content of the message. The identification information is unique information that enables to distinguish each device. For instance, the identification information may include a telephone number of an external terminal, an e-mail address of an external terminal, image information indicating an external terminal, communication record information with an external terminal, SNS information related to an external terminal, and the like.

The identification information related to the message may include identification information of an external terminal that has transmitted the message, and identification information of an external terminal that has transmitted or received the link message linked to the message.

For instance, referring to the first drawing of FIG. 4A, in a case where the message is an e-mail, the controller 180 may execute a message transmission function with respect to the link message linked to the e-mail, in a state that the e-mail received from an external terminal is displayed. Here, the message transmission function may mean an e-mail reply function or an e-mail forwarding function.

As shown in the second drawing of FIG. 4A, when the reply or forwarding function is executed, the controller 180 may detect identification information of one or more external terminal from the received e-mail. In this instance, when the one or more identification information is detected, the controller 180 may provide the detected identification information to a user according to a request by the user. For instance, as shown in the second drawing of FIG. 4A, the detected identification information may be displayed on the display unit 151 based on a touch applied to a region for inputting a recipient of a message, on the execution screen of the message transmission function.

That is, as shown in the third drawing of FIG. 4A, the controller 180 may display, using the detected identification information, a recipient list (400) including items indicating the detected identification information for use in a reply or forwarding function of an e-mail by a user.

Thus, a user may additionally select a recipient of an e-mail using the recipient list (400). For instance, referring to the third drawing of FIG. 4A, a user may select at least one identification information included in the recipient list (400).

As shown in the fourth drawing of FIG. 4A, when at least one identification information is selected by the user, the controller 180 may display an e-mail address indicating the selected identification information on a region for inputting a recipient of an e-mail on the execution screen of the message transmission function.

Meanwhile, the recipient list (400) may be displayed on a region adjacent to the region for inputting a recipient of an e-mail. Further, the recipient list (400) may be output in the form of a popup window which blocks at least part of the execution screen (330) indicating the message transmission function.

The recipient list (400) may be displayed in alphabetical order of the identification information, or based on a reception time of a message related to the identification information. Further, the recipient list (400) may be displayed as the identification information is grouped according to a preset condition.

In the above description, the grouping may mean that a plurality of identification information is classified into at least one group according to a preset condition. That is, each group may include at least one identification information among the plurality of identification information, based on a condition thereof.

The preset condition may be set by a user. For instance, a user may set the preset condition as relation information with a user of a mobile terminal.

Referring to the first and second drawings of FIG. 4B, the controller 180 may display a recipient list (410) on the display unit 151 based on a user's request.

Referring to the second drawing of FIG. 4B, the recipient list (410) may display identification information according to a group to which the identification information pertains. For instance, as shown in FIG. 4B, the recipient list (410) may display the identification information by categorizing into "company", "family" and "friend". That is, a user may easily recognize group information of each identification information through the grouped recipient list (410).

Further, the controller 180 may edit the recipient list (410) in different manners through different types of touches with respect to the recipient list (410). Edition of the recipient list (410) may mean addition or deletion of identification information to or from the recipient list, change of a group of the identification information, and the like.

For instance, as shown in the first drawing of FIG. 4C, the controller 180 may sense that a touch with a preset direction is applied to an item indicating one identification information in the recipient list (410). Here, the touch in a preset direction may be a drag input toward the left from the right based on a front surface of the display unit 151.

In this instance, referring to the second drawing of FIG. 4C, the controller 180 may control one of identification information to which the drag input is applied, to disappear from the recipient list (410). That is, the drag input toward the left from the right, based on the front surface of the display unit 151, may be associated to a deletion function of the identification information.

Though not shown, the controller 180 may execute a function to change a group of the identification information when another type of touch, which is different from the touch toward the left from the right based on the front surface of the display unit 151, is applied.

For instance, when a long touch is applied to an item indicating one of identification information in the recipient list (410), the controller 180 may execute a function to change a group to which the one of identification information pertains to another group.

Meanwhile, part among plural identification information related to the message may not be stored in the memory 170. In this instance, the controller 180 may provide identification information having a highest relationship with the part of the identification information in the memory 170, to a user. That is, the controller 180 may recommend identification information having a high relationship with the part of the identification information to a user. Alternatively, the controller 180 may receive information related to the part of the identification information from a preset external server. The preset external server may be a transmission and reception server of an e-mail.

According to the present invention, once a message transmission function is executed, it is possible not only to provide a recipient list to enable the message transmission function to be conveniently used, but to immediately edit the recipient list on an execution screen indicating the message transmission function.

Figure 5A:
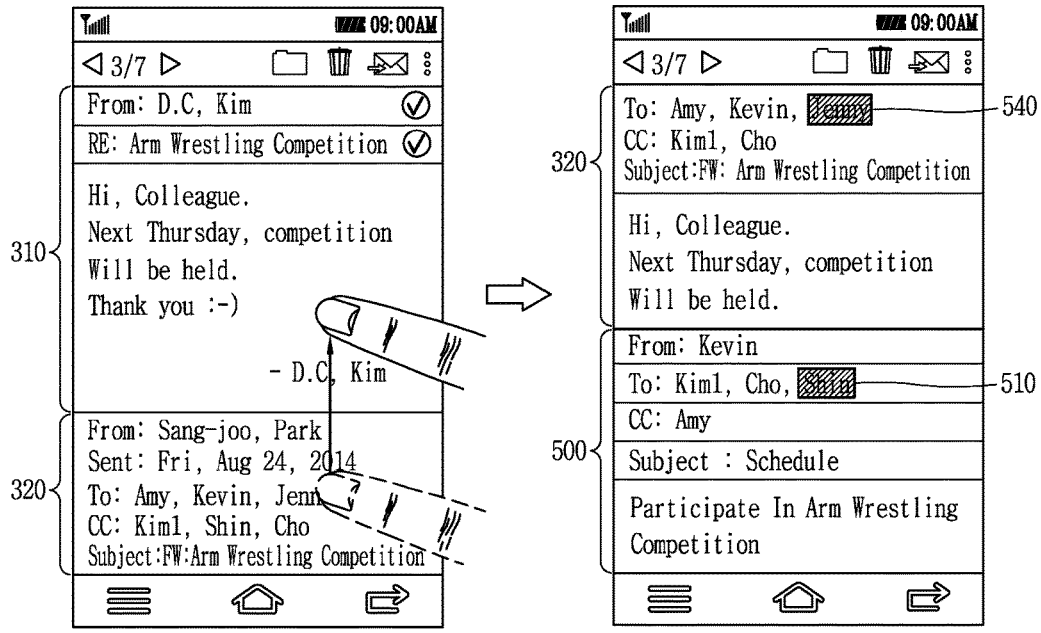
FIGS. 5A and 5B are schematic views illustrating a method to display features of identification information related to an e-mail, in a visually distinguishable manner, in a case where content of the e-mail is displayed on a display unit according to the present invention.
Figure 5B:
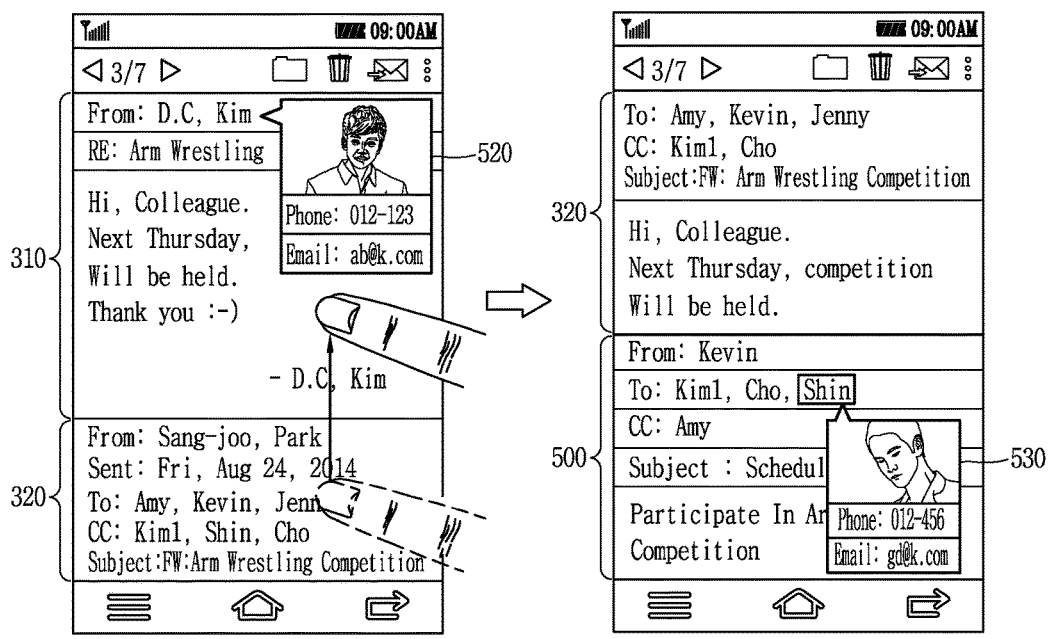

Hereinafter, a method to display plural identification information included in the message in a visually distinguishable manner, when content of the message is displayed on the display unit, will be specifically described. FIGS. 5A and 5B are schematic views illustrating a method to display features of identification information related to an e-mail in a visually distinguishable manner, in a case where content of the e-mail is displayed on the display unit according to the present invention.

The controller 180 may display content of a message received from an external terminal on the display unit 151. In this instance, the content of the message may include content of a link message linked to the message. Further, the content of the message may include plural identification information related to the message.

Meanwhile, the controller 180 may scroll the content of the message in response to a user's request for scrolling in a state that the content of the message is displayed on the display unit 151. The scrolling may be a motion to move screen information displayed on the display unit.

When the content of the message is scrolled according to the user's request, the controller 180 may display identification information which satisfies a preset condition among plural identification information related to the message, so as to be visually distinguished from other identification information. The preset condition may be a condition of identification information that has been added or which had disappeared, as a result of comparing identification information of one link message with identification information of another link message when the link message linked to the message is plural.

For instance, in a case where the message is an e-mail, referring to the first drawing of FIG. 5A, the controller 180 may scroll contents (310, 320) of the e-mail in response to a flicking input applied to the display unit 151 from the lower side to the upper side. In this instance, at least part (310) of the contents (310, 320) of the e-mail disappears from the display unit 151, and remaining part (320) may move to an upper end of the display unit 151. Furthermore, content of a new e-mail (500) which has not been displayed before the scrolling may be displayed on the display unit 151. When the content of the message is scrolled, the controller 180 may detect, compare and determine identification information of the message and the link message linked to the message. More specifically, the controller 180 may detect identification information related to each message, and compare and determine whether addition or deletion of identification information has been performed among the respective messages.

For instance, when the message is an e-mail, as shown in the second drawing of FIG. 5A, the controller 180 may compare identification information related to each e-mail displayed on the display unit 151, as well as scroll content of the e-mail. More specifically, the controller 180 may determine whether added identification information or disappeared identification information exists in an e-mail displayed on an upper end of the display unit 151, based on an e-mail displayed on a lower end of the display unit 151.

The controller 180 may display added or disappeared identification information so as to be visually distinguished from other identification information, if the added or disappeared identification information exists after comparing the identification information of each e-mail.

For instance, as shown in the second drawing of FIG. 5A, the controller 180 may display disappeared identification information (540) among identification information included in the link e-mail (320) displayed on the upper end of the display unit 151, based on a new e-mail (500) displayed on the lower end of the display unit 151, with a different shade from other identification information. Further, in a case where newly added identification information (510) exists in identification information included in the new e-mail (500) displayed on the lower end of the display unit

151 based on the e-mail (320) displayed on the upper end of the display unit, the controller 180 may display the newly added identification information (510) with a different shade from other identification information.

With such a configuration, a user can easily and visually recognize whether added or deleted identification information exists by each message when content of an e-mail is scrolled.

Meanwhile, when content of a message including identification information of higher importance is displayed on the display unit 151 based on a preset importance of identification information, the controller 180 may additionally provide information related to the identification information of higher importance.

For instance, when identification information of higher importance is detected from the content of the message, the controller 180 may output a popup window including information related to the identification information of higher importance.

The importance of identification information may be set by a user, or set based on usage information of the mobile terminal. The usage information may include frequency of usage of the identification information, and group information to which the identification information pertains.

Further, the importance of identification information may be determined by whether a specific keyword is included in content of the message. For instance, when a word "urgent" is detected from the content of the message, identification information related to the message may be set to have a higher importance.

The popup window may be output in response to a user's request, or in a case where a message including identification information related to the popup window is currently displayed on the display unit 151. Further, the popup window may be automatically disappeared when a preset time elapses, or may be continuously displayed while content of the message is scrolled. Further, the popup window may be output to a region adjacent to a region where identification information related to the popup window is displayed.

For instance, in a case where the message is an e-mail, as shown in the first drawing of FIG. 5B, when identification information of a higher importance is detected from contents (310, 320) of an e-mail currently displayed on the display unit 151, the controller 180 may output a popup window (520) indicating information related to the identification information of a higher importance.

Further, the controller 180 may scroll the contents (310, 320) in response to a user's request. In this instance, the controller 180 may control at least part (310) of the e-mail including the identification information of higher importance to disappear from the display unit 151. Further, the controller 180 may control the popup window (520) indicating information related to the identification information of a higher importance to disappear, together with the at least part (310) of the e-mail.

Also, the controller 180 may display a new e-mail (500) on the display unit 151 by the scrolling. In this instance, the controller 180 may detect whether or not identification information of a higher importance is included in the new e-mail (500).

As shown in the second drawing of FIG. 5B, when identification information of a higher importance is included in the new e-mail (500), the controller 180 may output a popup window (530) including information related to the identification information of a higher importance.

Further, according to the present invention, it is possible to execute a separate function different from the message transmission function using information related to the identification information included in the popup window. For instance, when the information related to the identification information included in the popup window is telephone number information, the controller 180 may transmit a call signal to an external terminal indicated by the telephone number information, in response to a touch with respect to the telephone number information. That is, according to the present invention, it is possible to execute various functions which are executable in the mobile terminal using information related to the identification information included in the popup window.

Meanwhile, although displaying identification information of a higher importance through a popup window has been described hereinbefore, the present invention is not limited to this. That is, a user can recognize importance of identification information through various methods such as highlighting (for instance, a color change, a light and darkness change, and the like) of the identification information.

According to the present invention, in a case where content of a message includes contents of plural link messages linked to the message, a popup window is output with respect to identification information of a higher importance so that importance of the message can be notified to a user. Further, according to the present invention, it is possible to recall information that may be missed by a user by visually and variously displaying identification information related to transmission and reception of an e-mail.

Hereinbelow, a method to select at least part of the link messages linked to the message of the plural messages when content of a message includes content of plural link messages linked to the message, will be described. FIGS. 6A and 6B, 7A and 7B and 8 are schematic views illustrating a method to select at least part of plural link e-mails in a case where content of a message includes contents of the plural link e-mails associated with the e-mail according to the present invention.

When content of a message includes contents of plural link messages linked to the message, the controller 180 may execute a message transmission function with respect to at least part of the plural link messages.

In this instance, the controller 180 may output graphic objects (600, 610) for selecting at least part of the link message, to part of a region where content of the message is displayed.

Figure 6A:
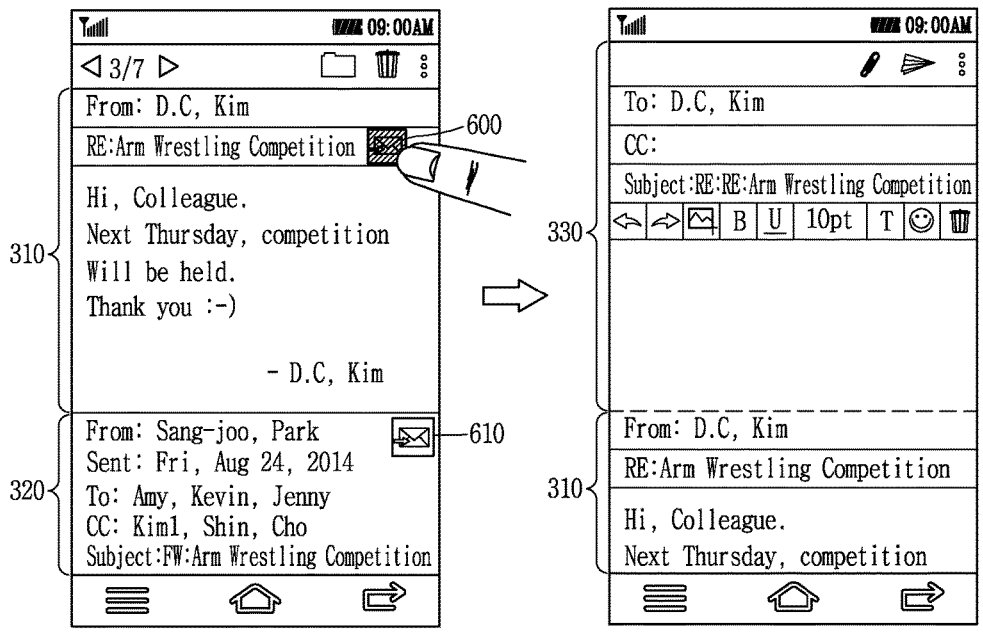
FIGS. 6A and 6B, 7A and 7B and 8 are schematic views illustrating a method to select at least part of plural related e-mails when content of the e-mail includes content of the plural related e-mails according to the present invention.

For instance, referring to the first drawing of FIG. 6A, contents (310, 320) of an e-mail may be displayed on the display unit 151. In this instance, the controller 180 may recognize a region where the content (320) of a link e-mail is displayed, on the contents (310, 320) of the e-mail, and display a first graphic object (600) for selecting the content (310) of a different mail from the link e-mail and a second graphic object (610) for selecting the content (320) of the link e-mail on the display unit 151, respectively.

The controller 180 may set an object message which is an object of the message transmission function, based on a selection of the graphic object. In this instance, the controller 180 may control content of the object message to be included in an execution screen of the message transmission function.

For instance, as shown in the second drawing of FIG. 6A, in a case where the message is an e-mail, the controller 180 may execute a reply or forwarding function with respect to content (310) of another mail different from the link e-mail when the first graphic object (600) is selected. Alternatively, the controller 180 may not execute the reply or forwarding function with respect to the link e-mail.

As described hereinbefore, though the graphic object for selecting at least part among the plural link messages may be displayed on each region where each link message is displayed, one graphic object may be displayed while being moved by scrolling.

More specifically, a graphic object for selecting at least part among the link messages may be output to the periphery of a region according to a user's scrolling request, the region where a message that occupies a largest region among the plural link messages being currently output to the display unit 151 is displayed.

Figure 6B:
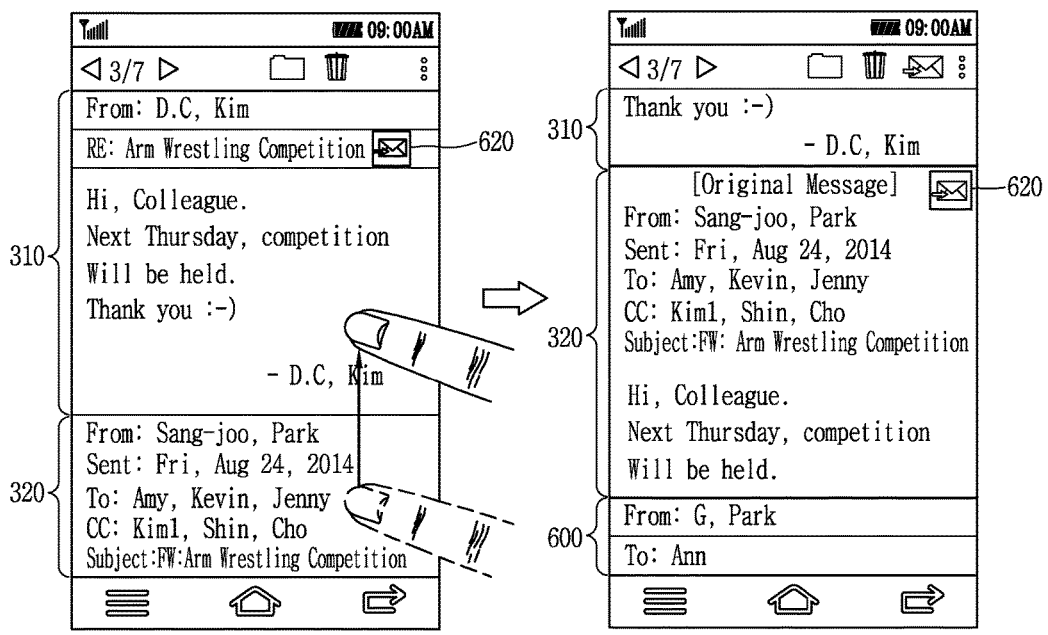

For instance, referring to the first drawing of FIG. 6B, the controller 180 may output a graphic object (620) for selecting at least part of link messages to one region in a state that contents (310, 320) of an e-mail are displayed on the display unit 151. In this instance, the graphic object (620) may be displayed on a larger region between a region where the content (320) of a link e-mail is displayed and a region where the content (310) of an e-mail, which is different from the content (320) of the link e-mail, is displayed.

Meanwhile, the graphic object (620) for selecting at least part of the link message may be moved as the content of the message displayed on the display unit 151 is scrolled. In this instance, the controller 180 may re-detect a link message that occupies a largest region among plural link messages being currently displayed on the display unit 151, and move the graphic object (620) for selecting the link message to the periphery of a region where the re-detected link message is displayed.

For instance, in a case where the message is an e-mail, as shown in the second drawing of FIG. 6B, when the contents (310, 320) of the e-mail are scrolled, the controller 180 may control at least part (310) of the contents (310, 320) to disappear from the display unit 151, and at least part (600) of a new e-mail that has not been displayed before the scrolling to be displayed.

In this instance, the controller 180 may detect the link e-mail (320) displayed on a largest region among the contents (310, 320, 600) of an e-mail newly displayed by the scrolling, and output a graphic object (620) for selecting the link e-mail to a region where the detected link e-mail (320) is displayed.

When the graphic object for selecting at least part of link messages for the message transmission is selected, the controller 180 may set, as an object message, a link message output to a region most adjacent to a region where the graphic object is displayed, and execute a message transmission function with respect to the object message.

Meanwhile, when plural link messages exist, the controller 180 may select at least part of the plural link messages on an execution screen of the message transmission function and execute the message transmission function.

Figure 7A:
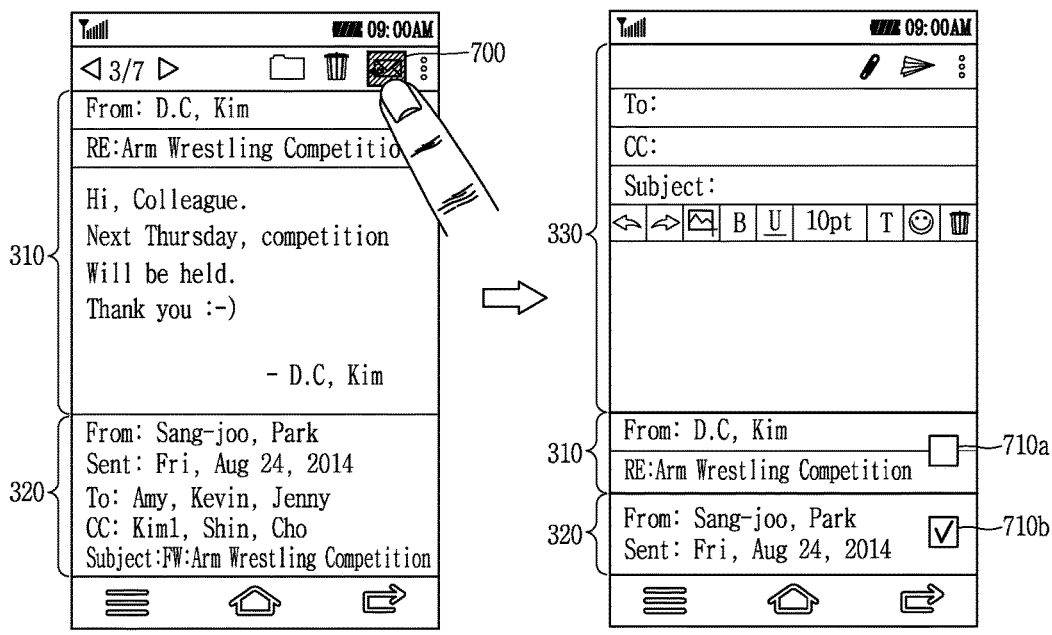

For instance, in a case where the message is an e-mail, referring to the first drawing of FIG. 7A, the controller 180 may display a graphic object (700) related to an e-mail function on a region where the contents (310, 320) of the e-mail are displayed.

When the graphic object (700) related to the e-mail function is selected, the controller 180 may output an execution screen of the e-mail function. For instance, the controller 180 may output an execution screen (330) of a reply function.

In this instance, content of a message including contents of the plural link messages may be displayed on the execution screen of the message transmission function. In this instance, a user may set at least part of the plural link messages as an object message on the execution screen of the message transmission function.

For instance, when the message is an e-mail, referring to the second drawing of FIG. 7A, content of an e-mail including contents of the plural link e-mails may be displayed on the execution screen (330) of the reply function. In this instance, selection images (710a, 710b) for selecting each link e-mail as an object message may be displayed around a region where the plural link e-mails are displayed.

The controller 180 may set a link message selected by the selection images (710a, 710b) as an object message, and execute a message transmission function with respect to the object message. Also, the controller 180 may not execute a message transmission function with respect to a link message which is not selected by the selection images (710a, 710b).

Meanwhile, when a flicking input with a preset direction is sensed on a region where plural link messages are displayed among the execution screen of the message transmission function, the controller 180 may execute a scrolling function with respect to the plural link messages. Through the scroll, when all of plural link e-mails are not displayed on the limited space, the controller 180 may provide a user with remaining link e-mails that have not been displayed.

Figure 7B:
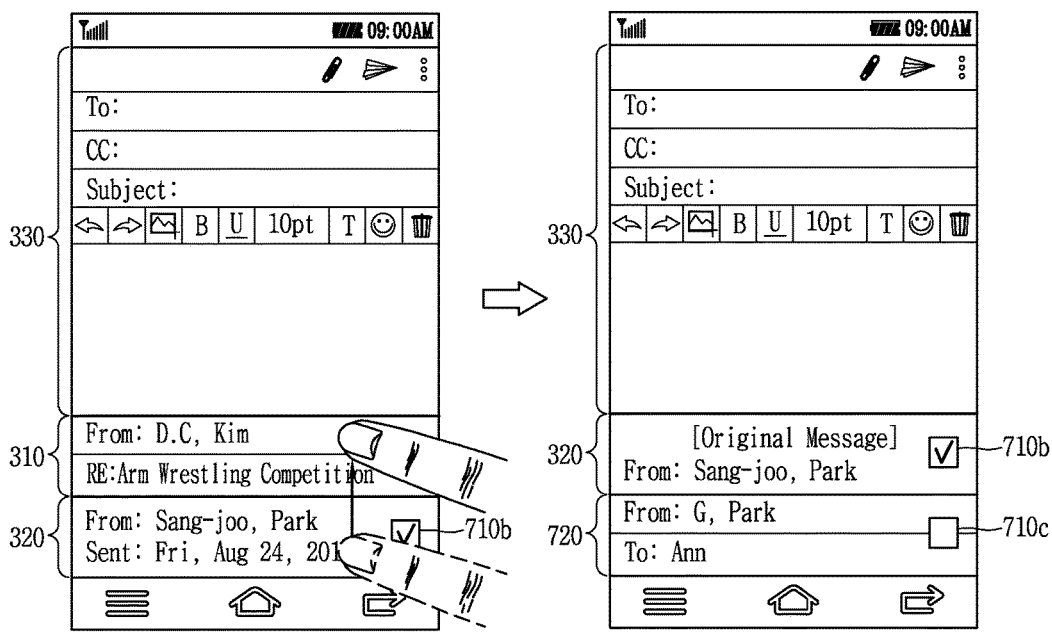

For instance, in a case where the message is an e-mail, as shown in the first drawing of FIG. 7B, when a flicking input with a preset direction is sensed on a region where contents (310, 320) of plural link messages are displayed, the contents (310, 320) of the plural link messages may be scrolled.

In this instance, the controller 180 may control at least part (310) of the displayed plural link messages (310, 320) to disappear from the display unit 151 by the scrolling, and a new link message (720) that has not been displayed before the scrolling to be displayed on the display unit 151. In this instance, a check box (710c) may be displayed around a region where the new link message (720) is displayed.

Meanwhile, though not shown, when a graphic object (700) indicating the message transmission function is selected, the controller 180 does not display immediately the execution screen of the message transmission function, but may output a selection image (for instance, a check box) around a region where a link message included in content of the message is displayed, on a region where the content of the message is displayed.

In this instance, the controller 180 may set an object message selected by the selection image, and when the graphic object (700) indicating the message transmission function is re-selected, the controller 180 may execute a message transmission function with respect to the object message.

With such a configuration, according to the present invention, it is possible to easily execute a function related to an e-mail with respect to part of at least one e-mail selected by a user.

Meanwhile, when a graphic object indicating a message transmission function is selected, the controller 180 may output a function list including items indicating the message transmission function. The items indicating the message transmission function may include an item indicating a reply function with respect to all link messages linked to a message, a reply function with respect to part of the link messages linked to a message, a forwarding function with respect to all link messages linked to a message, and a forwarding function with respect to part of link messages linked to a message.

Figure 8:
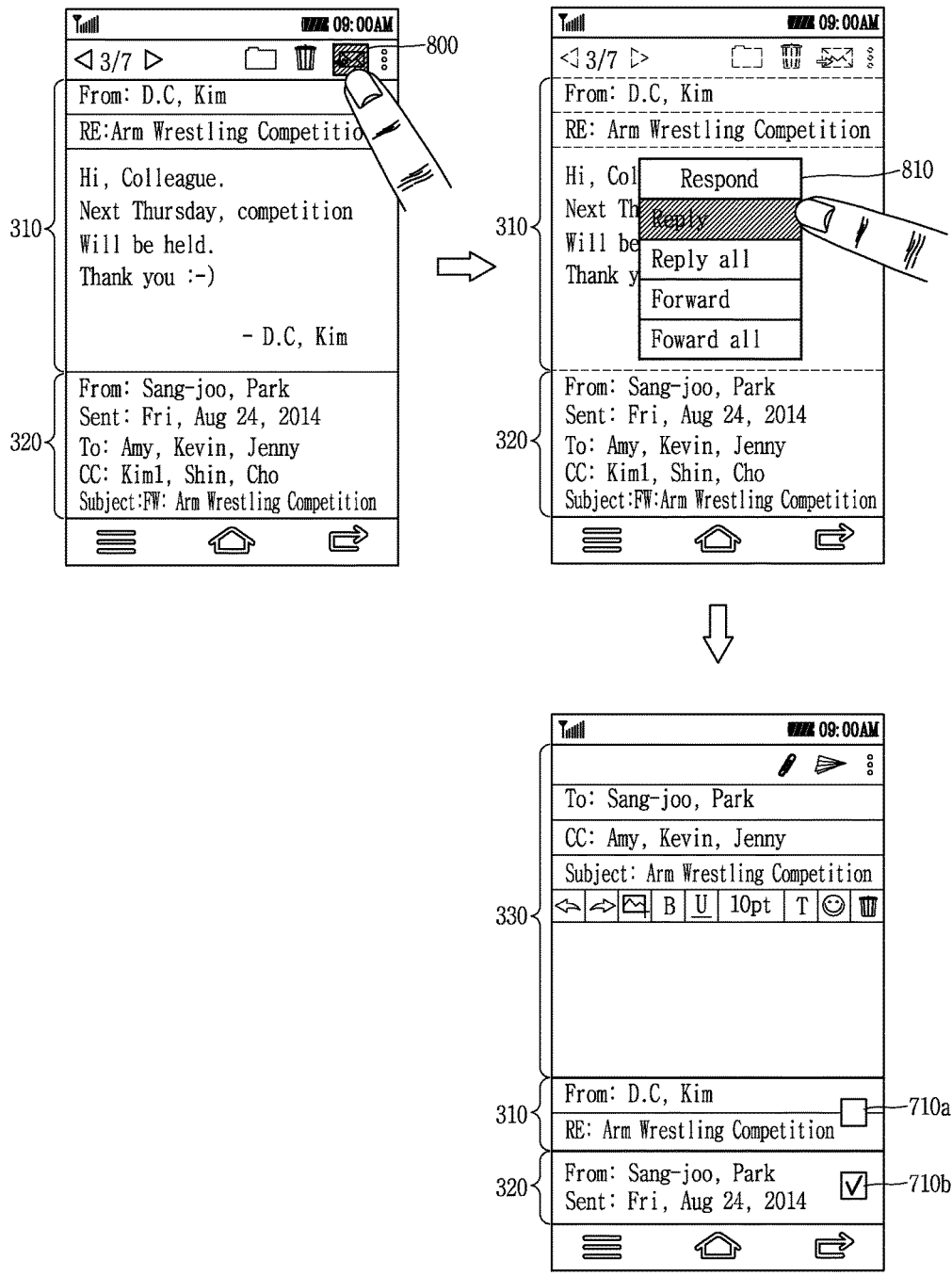

For instance, in a case where the message is an e-mail, referring to the first and second drawings of FIG. 8, when a graphic object (800) indicating a transmission function of an e-mail is selected, the controller 180 may output a function list (810) including function items related to the e-mail.

The function list (810) may include a function to reply to part of link e-mails (Reply), a function to forward to part of link e-mails (Forward), a function to reply to all link e-mails linked to the e-mail (Reply all), and a function to forward to all link e-mails linked to the e-mail (Forward all).

In this instance, referring to the second drawing of FIG. 8, a user may select a function to reply to part of link e-mails. In this instance, the controller 180 may execute a function to reply to part of link e-mails among plural link e-mails.

Referring to the third drawing of FIG. 8, when a function to reply to part of link e-mails is selected, the controller 180 may display contents (310, 320) of plural link e-mails and selection images (710a, 720b) for selecting the part of link e-mails on an execution screen (330) indicating the reply function.

That is, according to the present invention, it is possible to selectively execute functions related to an e-mail using a function list.

Figure 9A:
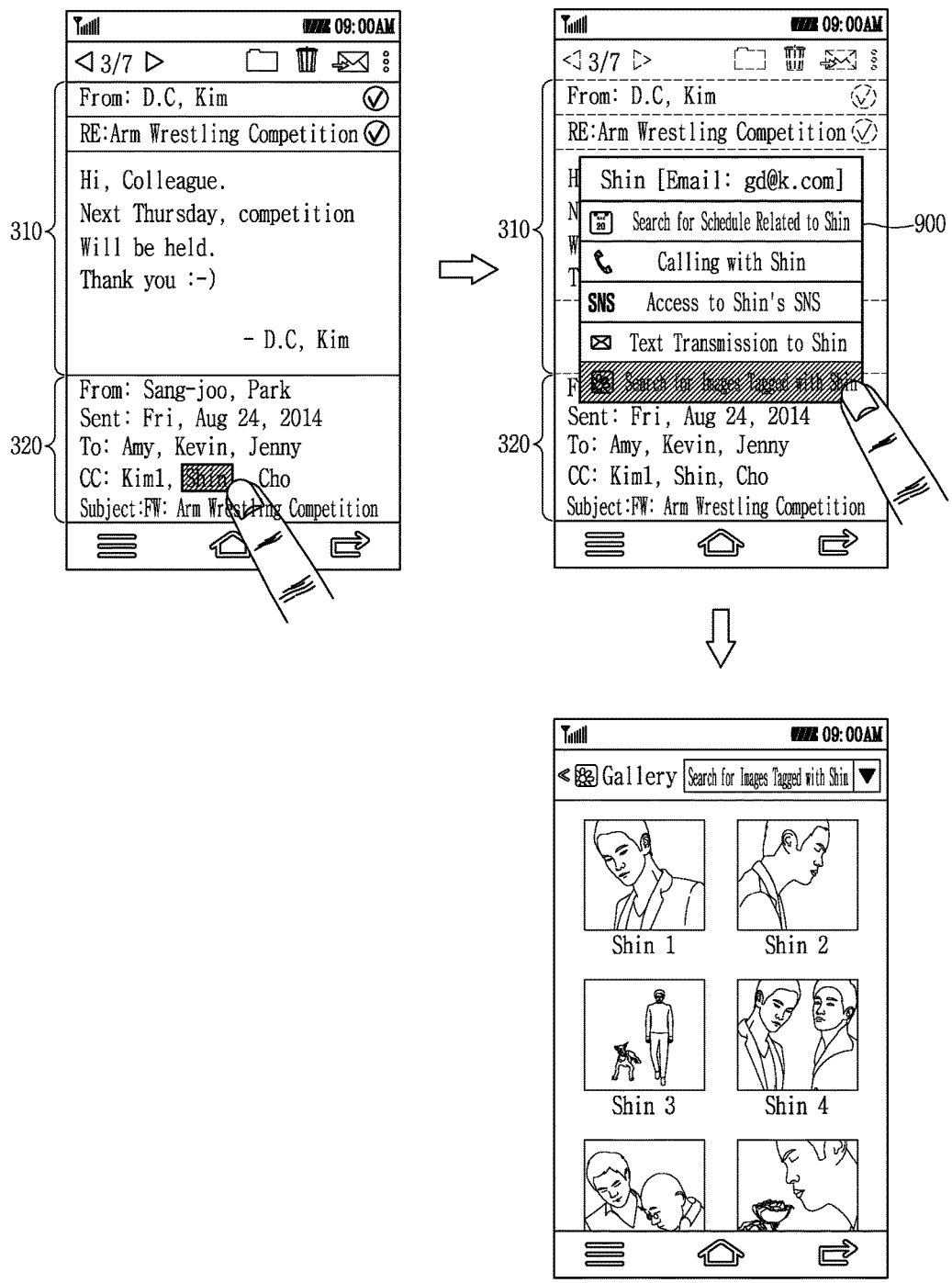
FIGS. 9A and 9B are schematic views illustrating a method to execute additional functions using identification information when identification information included in the e-mail is selected according to the present invention.
Figure 9B:
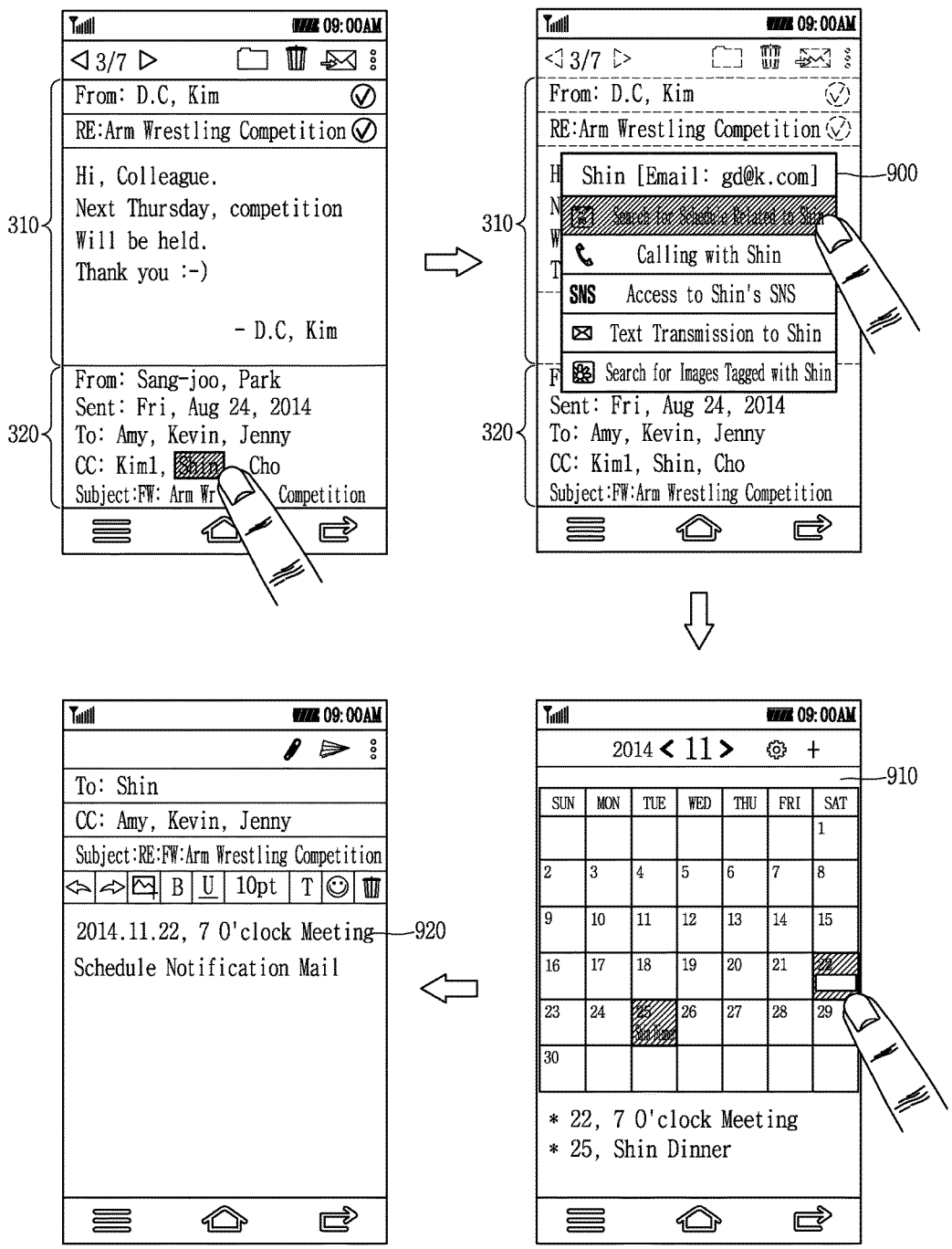

Hereinbelow, a method to execute additional functions using identification information when the identification information is selected by a user, will be described. FIGS. 9A and 9B are schematic views illustrating a method to execute additional functions using identification information in a case where the identification information included in an e-mail is selected according to the present invention.

When content of a message includes content of link messages linked to the message, the controller 180 may execute functions installed in the mobile terminal using at least one identification information related to the message. For instance, the controller 180 may execute a telephone function, a schedule search function, an SNS function, a text function, an image search function etc. using at least one identification information related to the message.

For instance, in a case where the message is an e-mail, as shown in the first drawing of FIG. 9A, when content of the e-mail includes plural link e-mails linked to the e-mail, the controller 180 may sense that a preset type of touch is applied to one identification information (for instance, "Shin") among at least one identification information related to the e-mail.

In this instance, as shown in the second drawing of FIG. 9A, the controller 180 may output a sharing list (900) including executable functions using the identification information. The sharing list (900) may include a schedule search function related to the identification information, a call function with an external terminal indicated by the identification information, an SNS function related to the identification information, a text transmission function to an external terminal indicated by the identification information, and an image search function for images including the identification information. The sharing list (900) may further include various functions executable using the identification information, in addition to the above described functions.

Meanwhile, referring to the second and third drawings of FIG. 9A, when an image search function for images including the specific identification information is selected, the controller 180 may search images including the specific identification information among plural images stored in the memory 170 of the mobile terminal. More specifically, the controller 180 may search images tagged with specific identification information among plural images. Here, images tagged with identification information may mean an image stored in an associated with manner with identification information. In this instance, at least one image tagged with the specific identification information may be output to the display unit 151.

Furthermore, after executing an additional function using the specific identification information, the controller 180 may re-execute an e-mail function using the additional function.

For instance, as shown in the first and second drawings of FIG. 9B, when a schedule search function related to specific identification information is selected, the controller 180 may execute a schedule search related to the specific identification information.

When the schedule search is executed, as shown in the third drawing of FIG. 9B, screen information (910) related to schedule information may be displayed on the display unit 151. Here, schedules related to the specific identification information may be displayed distinguishably from other schedules on the screen information (910) related to schedule information.

In this instance, when a preset type of touch (for instance, a long touch) is applied to a schedule related to the specific identification information, the controller 180 may execute a function to transmit an e-mail including the schedule information. For instance, as shown in the fourth drawing of FIG. 9B, the controller 180 may output screen information (920) to transmit an e-mail including the schedule information.

With such a configuration, according to the present invention, it is possible to provide not only an additional function using identification information included in a message, but a message using the additional function.

Figure 10A:
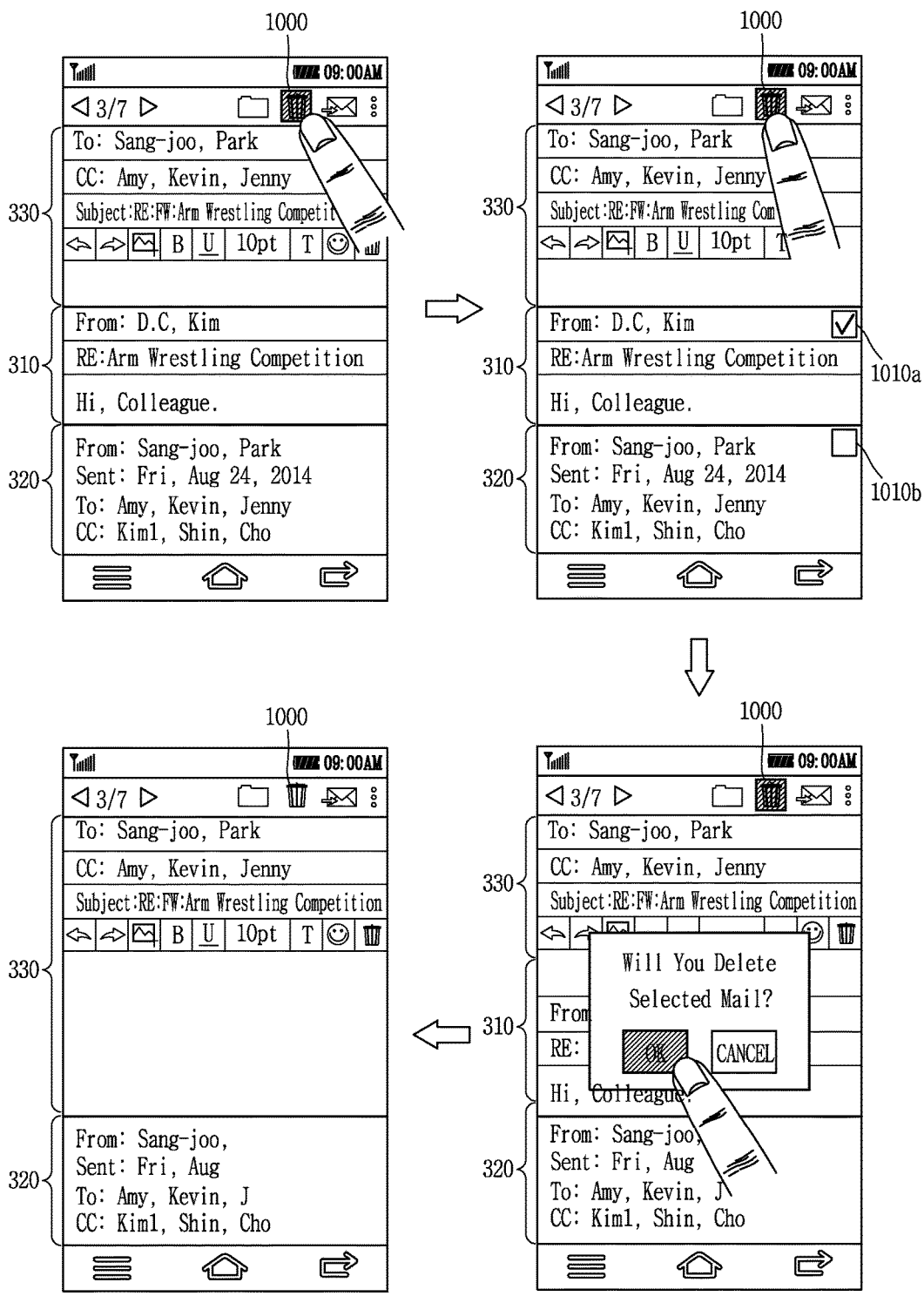
FIGS. 10A through 10C are schematic views illustrating a method to delete part of related e-mails when executing transmission of an e-mail, in a case where content of the e-mail includes content of the related e-mails related to the e-mail according to the present invention.
Figure 10B:
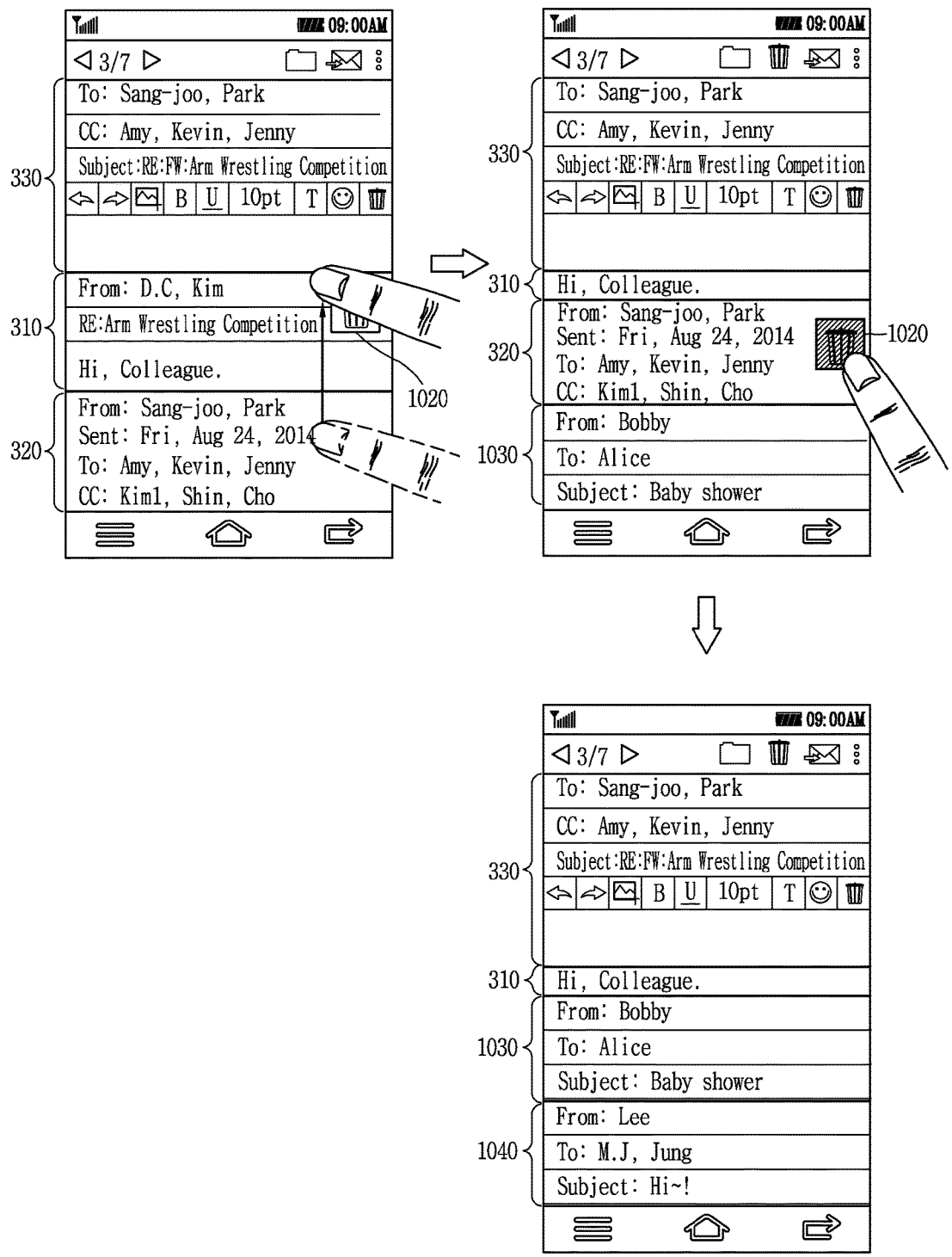
Figure 10C:
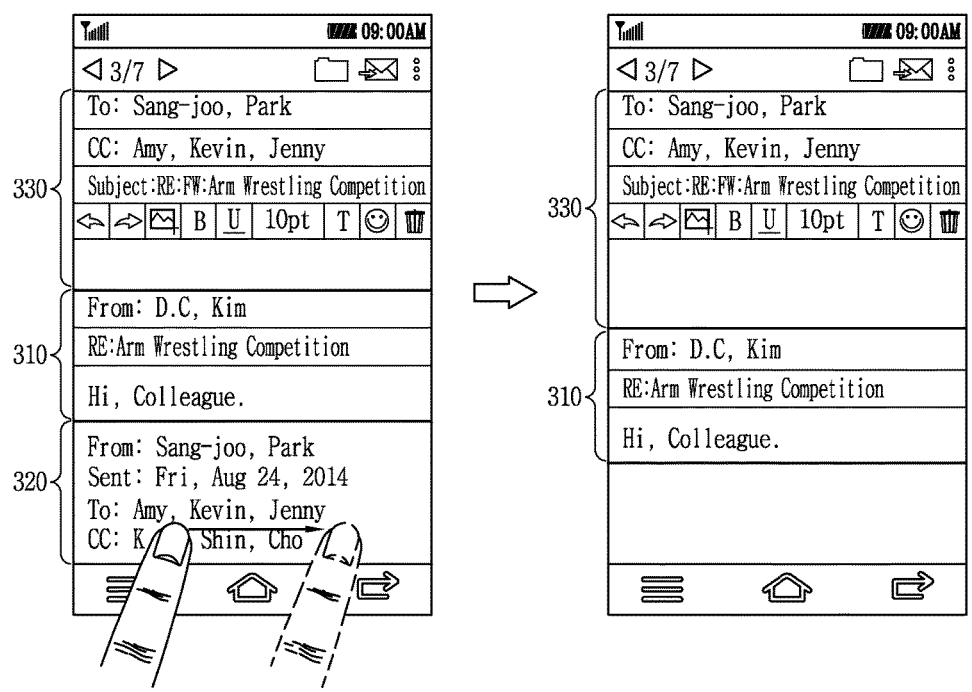

Hereinbelow, a method to delete at least part of link messages when content of a message includes contents of link messages linked to the message, will be described. FIGS. 10A through 10C are schematic views illustrating a method to delete part of linked e-mails when executing an e-mail transmission function, in a case where content of an e-mail includes contents of the linked e-mails according to the present invention.

In a case where content of a message includes contents of plural link messages linked to the message, the controller 180 may delete part of the link messages and execute a function related to an e-mail with respect to remaining link messages, in a state that the content of the message is displayed on the display unit 151. Here, deletion of the part of the link messages may mean that a link message to be deleted disappears from the display unit 151. Further, deletion of the part of the link messages may mean that the part of the link messages is not selected as an object message of a message transmission function.

For instance, the message may be an e-mail. In this instance, as shown in the first drawing of FIG. 10A, in a case where content of the e-mail includes contents of plural link e-mails linked to the e-mail, an execution screen (330) of a reply function may be displayed on the display unit 151.

In this instance, contents (310, 320) of the plural link e-mails may be displayed on the execution screen (330) of the reply function. Further, a graphic object indicating a function to delete an e-mail may be displayed on the execution screen (330) of the reply function.

Referring to the second drawing of FIG. 10A, when a graphic object (1000) for deleting the e-mail is selected, the controller 180 may output icons (1010a, 1010b) for selecting an object to be deleted among the plural link e-mails (310, 320). In this instance, when part (310) of the plural link e-mails (310, 320) is selected, the controller 180 may set the selected link e-mail (310) as an object e-mail to be deleted.

In this instance, as shown in the second and third drawings of FIG. 10A, when the graphic object (1000) for deleting the e-mail is selected, the controller 180 may output a popup window inquiring whether to delete the selected e-mail.

As shown in the fourth drawing of FIG. 10A, when the content (310) of the selected link e-mail is deleted, the controller 180 may control the content of the selected link e-mail (310) to disappear from the execution screen of the reply function, and set the content (320) of the remaining link e-mail that has not been deleted as an object mail of the reply function, and execute a reply function using the object mail.

Meanwhile, a graphic object indicating a function to delete the message may be output around a region of a message to be deleted.

For instance, the message may be an e-mail. In this instance, as shown in the first drawing of FIG. 10B, contents (310, 320) of plural link e-mails may be displayed on the execution screen (330) indicating the reply function on the display unit 151.

In this instance, the controller 180 may output a graphic object (1020) indicating a function to delete an e-mail to a region where the content (310) of one link e-mail is displayed, among the regions where the contents (310, 320) of the plural link e-mails are displayed.

Here, the graphic object (1020) indicating a function to delete an e-mail may be displayed on a largest region, among the regions where the contents (310, 320) of the plural link e-mails are displayed. Further, the graphic object (1020) indicating a function to delete an e-mail may be moved together with the contents (310, 320) of the plural link e-mails by scrolling.

For instance, as shown in the second drawing of FIG. 19B, in a case where the contents (310, 320) of the plural link e-mails are scrolled, the controller 180 may control at least part (310) of the contents (310, 320) of the plural link e-mails to disappear from the display unit 151, and a new link e-mail (1030) that has not been displayed before the scrolling to be displayed on the display unit 151.

In this instance, the controller 180 may detect the content (320) of a link e-mail displayed on a largest region among regions where the contents (310, 320) of the plural link e-mails are displayed. Also, the controller 180 may display the graphic object (1020) indicating a deletion function of an e-mail around the content (320) of the link e-mail displayed on the largest region.

When a touch to the graphic object (1020) indicating a deletion function of an e-mail is sensed, the controller 180 may control the content (320) of the link e-mail displayed on a region nearest to the graphic object (1020) at the time that the touch has been applied, to disappear from the display unit 151.

In this instance, as shown in the third drawing of FIG. 10B, a new link e-mail that has not been output before the deletion of the link e-mail (320) may be output to the display unit 151.

Meanwhile, when at least part of the link e-mails is deleted from the execution screen (330) of a reply function, the controller 180 may set, as an object message, the remaining undeleted mails among the link e-mails linked to the e-mail, and execute a reply function with respect to the object message.

Furthermore, when a long touch is applied to the graphic object (1020) indicating a function to delete an e-mail, the controller 180 may control content of a link e-mail displayed on a region where the touch is applied, and contents of link e-mails displayed on a region consecutive to the region where the link e-mail is displayed (for instance, link e-mails displayed on a region adjacent to the region where the link e-mail is displayed among display regions), to disappear from the display unit 151. In this instance, a user may control a plurality of mails to disappear from the display unit 151, at a time by a single long touch.

Further, in a state that content of a message including contents of a plurality of link e-mails linked to the message is displayed on the display unit 151, the controller 180 may execute a function to delete the message in response to a preset type of touch applied to a specific region among regions where the content of the message is displayed. The preset type of touch may include a drag touch with a preset direction, a long touch, a multi-touch, a flicking touch, and the like.

For instance, in a case where the message is an e-mail, as shown in the first drawing of FIG. 10C, the controller 180 may sense that a flicking touch with a preset direction is applied to a region where the content (320) of the link e-mails is displayed, among regions where the contents (310, 320) of the link e-mails are displayed.

In this instance, the controller 180 may delete the content (320) of the link e-mail. Further, as shown in the second drawing of FIG. 10C, the controller 180 may control the content (320) of the link e-mail to disappear from the display unit 151.

Thus, according to the present invention, it is possible to delete content of a link message only through a simple operation, in a state that a plurality of link messages linked to a message are displayed in content of the message.

Figure 11A:
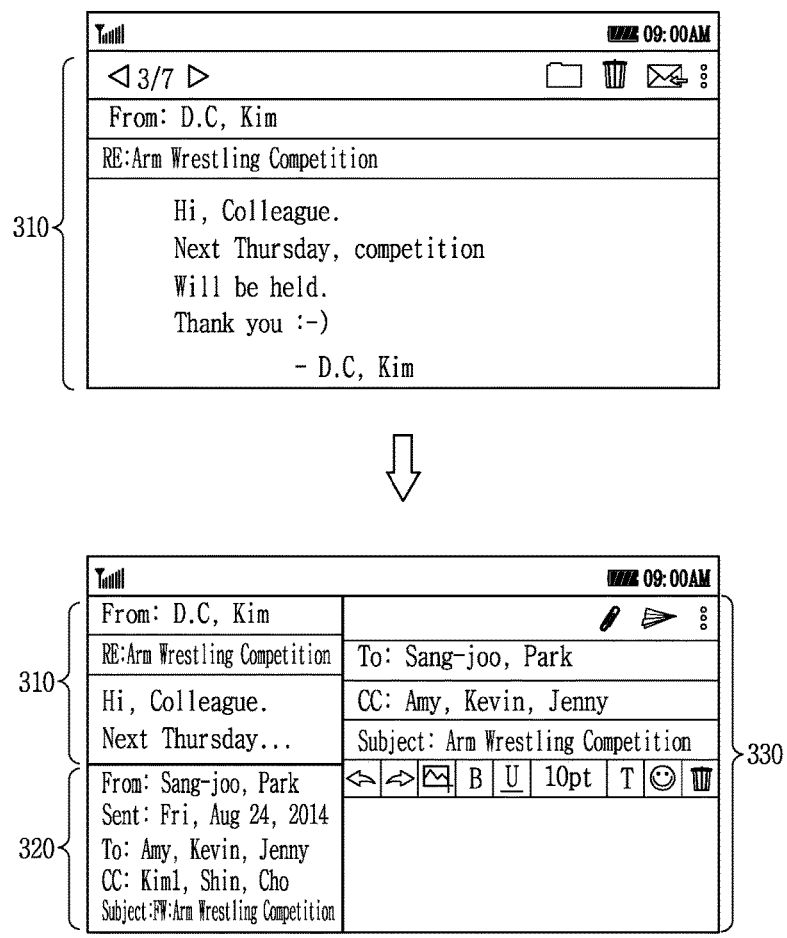
FIGS. 11A through 11C are schematic views illustrating a method to display content of a message containing content of a related message related to the message in a mobile terminal according to the present invention.
Figure 11B:
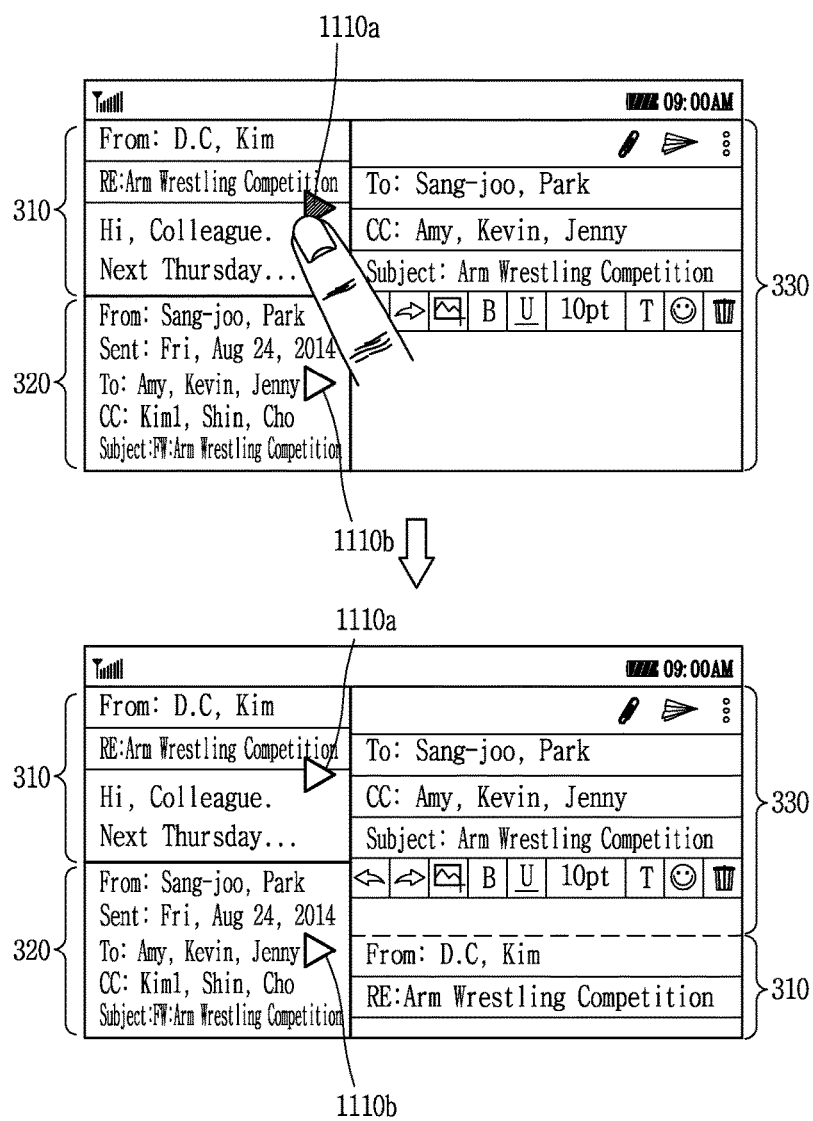
Figure 11C:
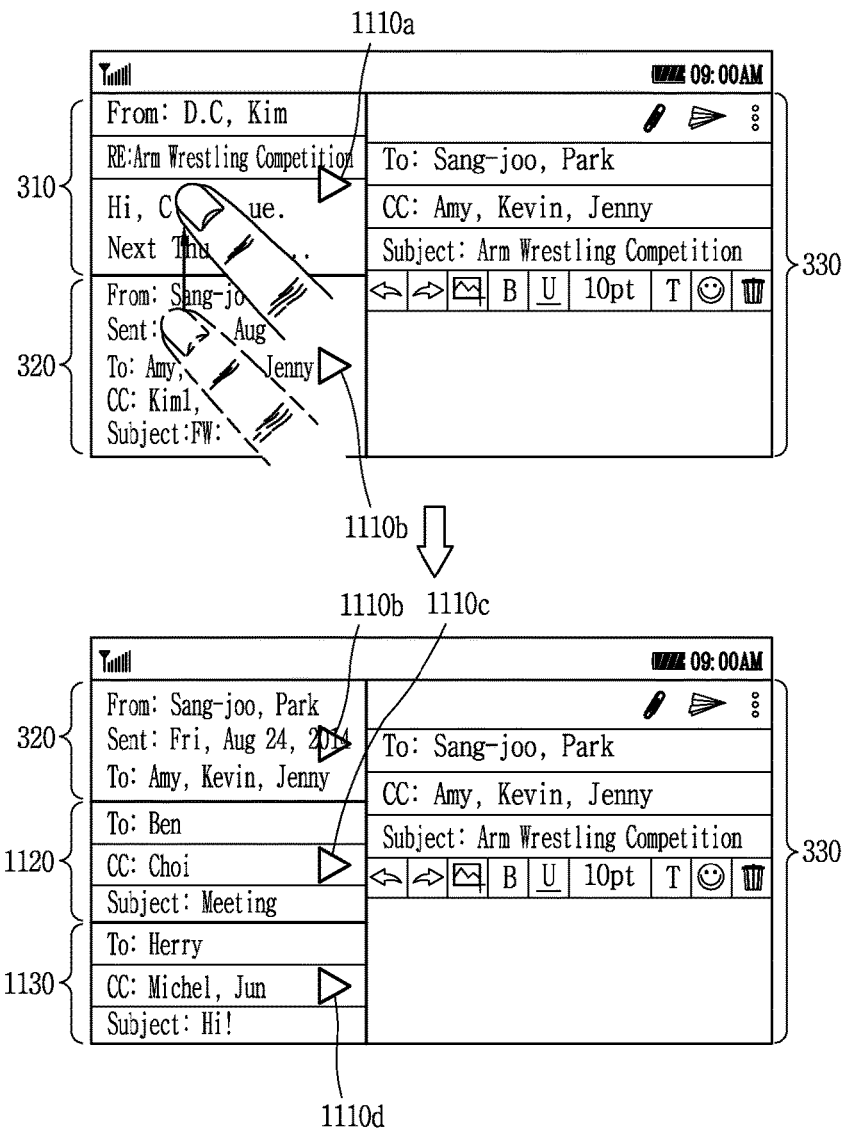

Hereinbelow, a method to display content of a message including content of a link message linked to the message according to a state of the display unit 151 will be described. FIGS. 11A through 11C are schematic views illustrating a method to display content of a message containing content of a link message linked to the message in the mobile terminal according to an embodiment of the present invention.

The display unit 151 according to an embodiment of the present invention may be in two modes according to a posture of the terminal body 100, i.e., a vertical mode in which the terminal body is long in a vertical direction (in height) and a horizontal mode in which the terminal body is long in a horizontal direction (in width).

Here, the controller 180 may display screen information in a different manner according to a mode of the display unit 151. For instance, the controller may display screen information so as to be proper to a vertically-long output region when the display unit 151 is in a vertical mode, and display screen information so as to be proper to a horizontally-long output region when the display unit 151 is in a horizontal mode.

For instance, as shown in the first drawing of FIG. 11A, in a horizontal mode of the display unit 151, the controller 180 may output contents (310, 320) of an e-mail including contents of link e-mails linked to the e-mail. In this instance, the controller 180 may execute a reply function of an e-mail in response to a preset type of touch applied to the display unit 151. The preset type of touch may be a drag input toward to the right from the left based on the front surface of the display unit 151.

In this instance, as shown in the second drawing of FIG. 11A, the controller 180 may control the display unit 151 to include a region (a first region) to display the contents (310, 320) of the e-mail and a region (a second region) to display an execution screen (330) of a reply function. That is, a user may simultaneously view screen information including at least two information using an output region that is long in a horizontal direction, in a case where the display unit 151 is in a horizontal mode.

Further, the controller 180 may connectively process the first region and the second region based on a user's control command. For instance, when a user's control command is received, the controller 180 may move information displayed on the first region to the second region.

For instance, as shown in the first drawing of FIG. 11B, the controller 180 may display the graphic objects (1110a, 1110b) indicating a function to move at least part of the contents (310, 320) of the e-mail displayed on the first region to the second region.

In this instance, when a touch is applied to one (1110a) of the graphic objects (1110a, 1110b), the controller 180 may move content of a link e-mail displayed on a region which is closest to a region where the one graphic object (1110a) is displayed to the second region.

For instance, as shown in the second drawing of FIG. 11B, the controller 180 may display, on the second region, content of a link e-mail displayed on a region which is closest to a region where the graphic object (1110a) is displayed. In this instance, the controller 180 may control the content of the link e-mail displayed on the region which is closest to the region where the graphic object (1110a) is displayed, to maintain the output state or to disappear from the first region.

According to the present invention, it is possible to divide an entire region of the display unit 151 that is horizontally long and provide different screen information to each region when the display unit 151 is in a horizontal mode.

Further, as shown in the first and second drawings of FIG. 11C, the controller 180 may scroll screen information displayed on the first region independently from the second region, in response to a drag input of a preset direction applied to the first region.

In this instance, through the scrolling, at least part (310) of the contents of the link e-mails displayed before the scrolling may disappear and at least parts (1120, 1130) of content of link e-mails that have not been displayed before the scrolling may be displayed. Further, graphic objects (1110c, 1110d) indicating a function to move screen information displayed on the first region, which has not been displayed before the scrolling, to the second region may be displayed.

That is, according to the present invention, when different screen information is displayed on each region, it is possible to more efficiently utilize each screen information through a simple operation to move different information between the regions.

Figure 12:
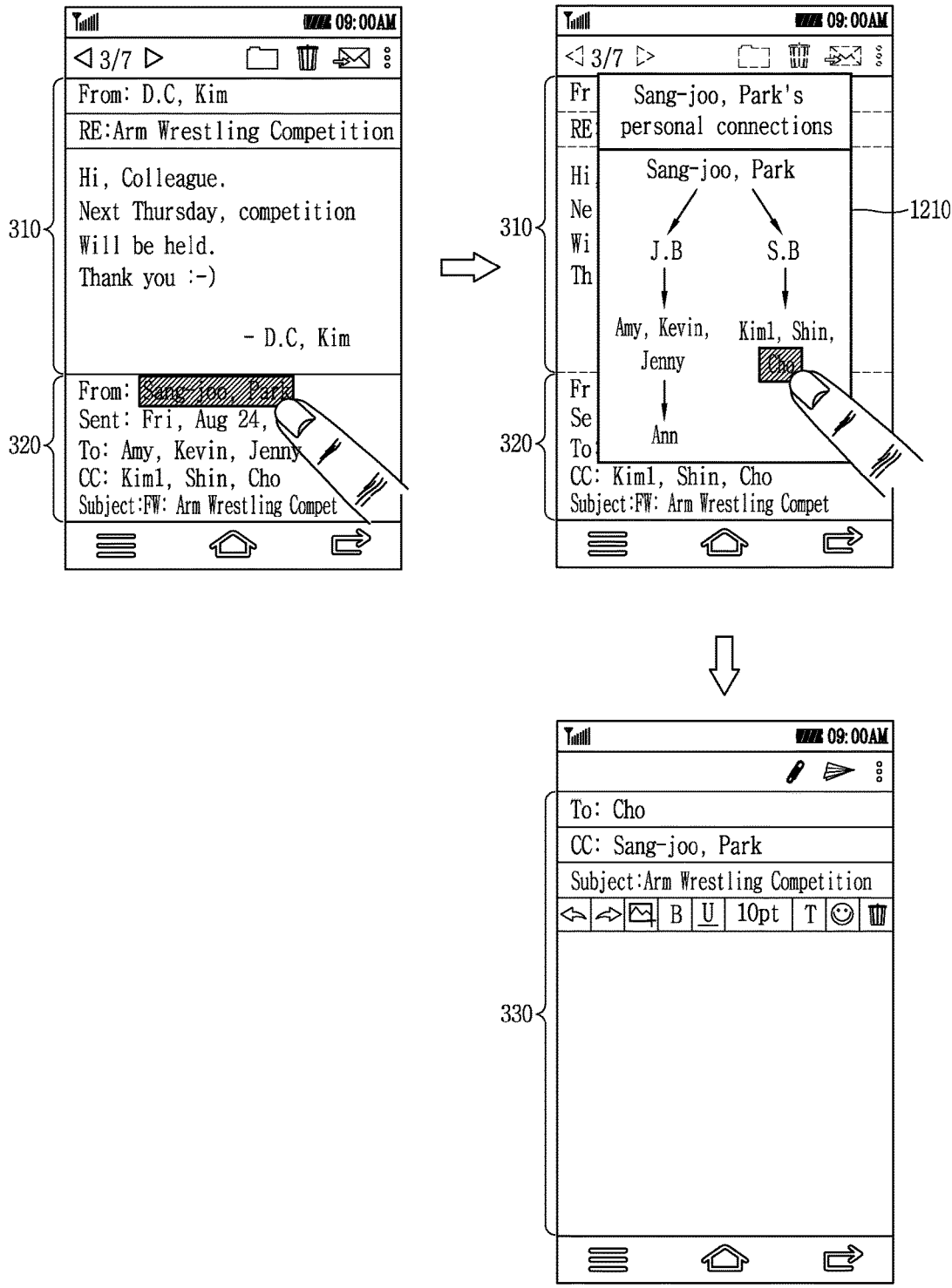
FIG. 12 is a schematic view illustrating a method to display plural identification information related to a message according to the present invention using personal connections information.

Hereinbelow, a method to provide identification information related to a message when the message includes contents of link messages linked to the message, will be described. FIG. 12 is a schematic view illustrating a method to display plural identification information related to a message based on personal connections information, according to an embodiment of the present invention. According to the present invention, it is possible to provide information on a relation among identification information to a user when a message includes contents of link messages linked to the message, using personal connections information among the plurality of identification information related to the message.

That is, according to the present invention, it is possible to detect a plurality of identification information from contents of a plurality of link messages linked to a message, and provide the plurality of identification information to a user in a tree structure so that a relation between the message and the link messages can be represented.

For instance, in a case where the message is an e-mail, as shown in the first drawing of FIG. 12, contents (310, 320) of a message including contents of a plurality of link messages may be output. In this instance, when one of a plurality of identification information (for instance, Sangjoo Park) included in the contents (310, 320) of the message is selected, the controller 180 may provide information of a tree structure reflecting a relation among the plurality of identification information, based on the one identification information. The relation may be determined by an analysis of the contents of the message, and based on information preset in the mobile terminal in relation to identification information (for instance, a position at a company).

As shown in the second drawing of FIG. 12, the controller 180 may output information (1210) of a tree structure reflecting a relation among the plurality of identification information based on the one of the identification information (for instance, Sangjoo Park), to the display unit 151.

As a result, a user may easily know the relation among the link messages linked to each other through the tree-structured information.

According to the present invention, in a case where content of a message includes contents of link messages linked to the message, it is possible to provide a method to selectively execute a message transmission function with respect to the content of the link message. As a result, a user can execute a message transmission function with respect to the link messages included in the content of the message with a single control command.

Further, according to the resent invention, it is possible to provide a method to execute various additional functions using identification information detected from the link messages included in the content of the message.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless Alternatively specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:
1. A mobile terminal, comprising:
a wireless communication unit configured to perform wireless communication with an external device;
a display; and
a controller configured to:
cause the display to display a first screen including a message received from a first sender corresponding to the external device, the message including first content newly added by the first sender and second content of an original message originated from a second sender, wherein the first screen is related to a message function, and wherein the second content of the original message includes first identification information corresponding to the second sender and second identification information corresponding to a receiver of the original message;
cause the display to display a function list in response to a touch received at a portion of the original message where the first or second identification information is displayed, the function list including at least one function that is executable using the first or second identification information and that is different from the message function;
execute one of the at least one function using the first or second identification information when the one of the at least one function is selected from the function list;
cause the display to display a second screen including an execution screen of the executed one of the at least one function, wherein the second screen is different from the first screen and is not related to the message function; and
cause the display to display a third screen for message transmission including information related to the executed one function to transmit a new message to the second sender corresponding to the first identification information or the receiver corresponding to the second identification information when a pre-set touch input is received via the second screen, wherein the third screen is different from the first and second screens and is related to the message function,
wherein the at least one function comprises at least an e-mail transmission function, a short message service (SMS) function, a contact information function, a texting function, or a scheduling function.

2. The mobile terminal of claim 1, wherein the new message identifies the second sender as a first recipient of the new message.

3. The mobile terminal of claim 2, wherein the controller is further configured to:
cause the display to display a recipient list including a second recipient in response to an input received while the second sender is identified as the first recipient of the new message, the recipient list displayed while the new message is displayed; and
add the second recipient in the new message in response to selection of the second recipient from the recipient list such that the new message is transmissible to the first and second recipients.

4. The mobile terminal of claim 3, wherein the second recipient is associated with at least the message or the original message.

5. The mobile terminal of claim 4, wherein the recipient list further includes a plurality of recipients that are grouped based on preset criteria such that each of the plurality of recipients belongs to one of at least two groups distinguishably identified in the recipient list.

6. The mobile terminal of claim 1, wherein:
the controller is further configured to cause the display to display a first graphic object corresponding to the message and a second graphic object corresponding to the original message; and
the touch is applied to the second graphic object displayed at the portion of the original message.

7. The mobile terminal of claim 1, wherein:
the controller is further configured to cause the display to display a graphic object for selecting the message or the original message;
the graphic object is associated with the message while a first area including the message is greater than a second area including the original message such that the message is selected with respect to a function to be performed when the graphic object associated with the message is touched; and
the controller is further configured to associate the graphic object with the original message when the second area becomes greater than the first area in response to scrolling of the displayed message such that the original message is selected with respect to a function to be performed when the graphic object associated with the original message is touched.

8. The mobile terminal of claim 1, wherein the controller is further configured to cause the display to display a graphic object while the message is displayed such that selection of the graphic object causes at least:
displaying of a first icon for selecting the message and a second icon for selecting the original message; or
displaying of a screen for message transmission such that a new message to be transmitted is shown on the screen,
wherein the new message includes at least a portion of the first content of the message or the second content of the original message based on whether one or both of the first and second icons is selected.

9. The mobile terminal of claim 8, wherein the controller is further configured to cause the display to display a list including a first item corresponding to a message reply function and a second item corresponding to a message forward function such that the new message is transmitted in response to at least the message or the original message based on whether one or both of the first and second icons is selected when the first item is selected, and the new message is forwarded to a recipient when the second item is selected, the forwarded new message including the message, the original message, or both the message and original message based on the selected one or both of the first and second icons.

10. The mobile terminal of claim 8, wherein the controller is further configured to cause the display to:
display the screen in a first format or a second format based on an orientation of the mobile terminal;
display the screen in the first format, such that the message is not displayed with the screen, when the mobile terminal is in the first orientation; and
display the screen in the second format, such that the screen is displayed in a first region of the display and the message is displayed in a second region of the display, when the mobile terminal is in the second orientation.

11. The mobile terminal of claim 10, wherein while the mobile terminal is in the second orientation, the controller is further configured to cause the display to display the first content of the message in the second region such that the new message includes the first content of the message in response to selection of the message displayed in the first region.

12. The mobile terminal of claim 8, wherein the controller is further configured to cause the display to no longer display the second content of the original message in the new message when a flicking input is applied to the second content of the original message in a preset direction while the new message, including both the first content of the message and the second content of the original message, is displayed.

13. The mobile terminal of claim 1, wherein the function list overlaps the first screen such that a portion of the first screen overlapping the function list is not visible.

14. The mobile terminal of claim 13, wherein the first screen is not displayed when the second screen is displayed on the display.

15. The mobile terminal of claim 14, wherein the second screen is not displayed when the third screen is displayed on the display.

16. The mobile terminal of claim 1, wherein the e-mail transmission function, the short message service (SMS) function, the contact information function, the texting function, and the scheduling function are functions to be performed with respect to the second identification information.

17. The mobile terminal of claim 1, wherein:
the touch input is received on the second identification information included in the original message;
the executed one of the at least one function is the scheduling function;
at least one schedule associated with the second identification information is indicated in the second screen;
information related to the at least one schedule is included in the new message in response to selection of the at least one schedule from the second screen; and
the controller is further configured to cause the wireless communication unit to transmit the new message including the information related to the at least one schedule to the receiver corresponding to the second identification information.

18. A method for controlling a mobile terminal, the method comprising:
displaying a first screen including a message received from a first sender corresponding to an external device on a display, the message including first content newly added by the first sender and second content of an original message originated from a second sender, wherein the first screen is related to a message function, and wherein the second content of the original message includes first identification information corresponding to the second sender and second identification information corresponding to a receiver of the original message;
displaying a function list in response to a touch received at a portion of the original message where the first or second identification information is displayed, the function list including at least one function that is executable using the first or second identification information and that is different from the message function;
executing one of the at least one function using the first or second identification information when the one of the at least one function is selected from the function list;
displaying a second screen including an execution screen of the executed one of the at least one function, wherein the second screen is different from the first screen and is not related to the message function; and
displaying a third screen for message transmission including information related to the executed one function to transmit a new message to the second sender corresponding to the first identification information or the receiver corresponding to the second identification information when a pre-set touch input is received via the second screen, wherein the third screen is different from the first and second screens and is related to the message function,
wherein the at least one function comprises at least an e-mail transmission function, a short message service (SMS) function, a contact information function, a texting function, or a scheduling function.

19. The method of claim 18, wherein the new message identifies the second sender as a first recipient of the new message.

20. The method of claim 19, wherein the new message does not include the first content of the message and the second content of the original message.

* * * * *